United States Patent
Ina et al.

(10) Patent No.: US 8,253,669 B2
(45) Date of Patent: Aug. 28, 2012

(54) LIQUID CRYSTAL DISPLAY

(75) Inventors: Keiichi Ina, Osaka (JP); Yasutoshi Tasaka, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 265 days.

(21) Appl. No.: 12/812,311

(22) PCT Filed: Dec. 5, 2008

(86) PCT No.: PCT/JP2008/072191
§ 371 (c)(1),
(2), (4) Date: Jul. 9, 2010

(87) PCT Pub. No.: WO2009/122617
PCT Pub. Date: Oct. 8, 2009

(65) Prior Publication Data
US 2010/0289732 A1 Nov. 18, 2010

(30) Foreign Application Priority Data
Mar. 31, 2008 (JP) ................................. 2008-090981

(51) Int. Cl.
*G09G 3/36* (2006.01)

(52) U.S. Cl. ...................................................... 345/87

(58) Field of Classification Search ............... 345/87, 345/89, 92, 4, 211
See application file for complete search history.

(56) References Cited

U.S. PATENT DOCUMENTS

| | | | | |
|---|---|---|---|---|
| 7,580,022 B2 * | 8/2009 | Moon et al. | ...................... | 345/92 |
| 8,035,788 B2 * | 10/2011 | Kim et al. | ..................... | 349/144 |
| 8,054,242 B2 * | 11/2011 | Jin et al. | ............................. | 345/4 |
| 8,134,528 B2 * | 3/2012 | Shiomi et al. | ................... | 345/89 |
| 2002/0154084 A1 | 10/2002 | Tanaka | | |
| 2005/0248700 A1 | 11/2005 | Takagi | | |

(Continued)

FOREIGN PATENT DOCUMENTS

| | | |
|---|---|---|
| JP | 2003-280019 | 10/2003 |
| JP | 2007-163722 | 6/2007 |
| RU | 96121137 A | 1/1999 |

(Continued)

OTHER PUBLICATIONS

Russian Decision to Grant with English translation mailed Jan. 16, 2012 in Russian Application No. 2010132363.

(Continued)

*Primary Examiner* — Fred Tzeng
(74) *Attorney, Agent, or Firm* — Nixon & Vanderhye, P.C.

(57) ABSTRACT

A first edge (61a) and a second edge (61b) are not uniformly parallel to each other in a direction perpendicular to a first direction (A); a protrusion that is provided on one or both of the first edge (61a) and the second edge (61b), which protrusion protrudes into a slit (62b), is increased in just a direction from one predetermined region on one side of a bisector (C) shared by the first edge (61a) and the second edge (61b) to another region on the other side of the bisector C, which region on one predetermined region and the another region on the other side are regions of the first edge (61a) and the second edge (61b), and all of the protrusion(s) being extended into the slit to reach its maximum in the another region on the other side of the bisector. As a result, it is possible to achieve a liquid crystal display that is capable of generating alignment centers of liquid crystal molecules so that alignment centers of pairs of adjacent pixel electrodes are generated in uniform, which alignment center is generated in the vicinity of a slit sandwiched between pixel electrodes that are provided adjacent to each other in a direction in which the data signal lines extend and that are applied a voltage separately.

16 Claims, 19 Drawing Sheets

U.S. PATENT DOCUMENTS

| | | | |
|---|---|---|---|
| 2008/0180372 A1* | 7/2008 | Kim et al. | 345/87 |
| 2008/0266230 A1* | 10/2008 | Lee et al. | 345/92 |
| 2009/0086141 A1 | 4/2009 | Shoraku et al. | |
| 2009/0174637 A1* | 7/2009 | Fukami | 345/87 |
| 2009/0219476 A1 | 9/2009 | Tasaka et al. | |
| 2010/0118012 A1* | 5/2010 | Irie et al. | 345/211 |
| 2010/0118248 A1 | 5/2010 | Yoshida et al. | |
| 2010/0231567 A1* | 9/2010 | Fujioka et al. | 345/211 |
| 2010/0328291 A1* | 12/2010 | Ishizaki et al. | 345/211 |

FOREIGN PATENT DOCUMENTS

| | | |
|---|---|---|
| WO | WO 2007/123244 A1 | 11/2007 |
| WO | WO 2007/039967 A1 | 12/2007 |
| WO | WO 2008/023479 A1 | 2/2008 |

OTHER PUBLICATIONS

International Search Report for PCT/JP2008/072191, mailed Jan. 13, 2009.

* cited by examiner

LIQUID CRYSTAL DISPLAY

This application is the U.S. national phase of International Application No. PCT/JP2008/072191, filed 5 Dec. 2008, which designated the U.S. and claims priority to Japanese Patent Application No. 2008-090981, filed 31 Mar. 2008, the entire contents of each of which are hereby incorporated by reference.

TECHNICAL FIELD

The present invention relates to a liquid crystal display including a liquid crystal layer of a vertical alignment mode.

BACKGROUND ART

A liquid crystal display driven by vertical alignment (VA: Vertical Alignment) mode includes a liquid crystal layer that employs homeotropic alignment, in which liquid crystal molecules are aligned perpendicularly to a substrate. When no voltage is applied across the liquid crystal layer, no change occurs to a state of polarized light that transmits through the liquid crystal layer. Thus, it is possible to carry out normally black display by arranging a polarizing plate in crossed Nicols. This improves deepness of the black display, thereby attaining a large contrast. However, while a voltage is applied across the liquid crystal layer, the liquid crystal molecules fall towards a substrate surface. Hence, with liquid crystal cells of a single domain structure, directions in which the liquid crystal molecules fall become lopsided, thereby causing colors to appear differently, depending on a viewed direction.

Accordingly, a MVA (Multi-domain Vertical Alignment) mode has been developed, which allows sighting a same display upon viewing from various directions. With the MVA mode, a liquid crystal cell is divided into a plurality of domains within a plane of the liquid crystal cell by use of an alignment control structure such as a rib. Directions in which the liquid crystal molecules fall are changed between the domains by use of the alignment control structure and a fringe electric field (oblique electric field) at a time when a voltage is applied, so that a screen is displayed evenly towards multiple directions.

Moreover, a PVA (Patterned Vertical Alignment) mode is also accomplished; slits are formed above and below a liquid crystal layer to serve as an alignment control structure, so that a plurality of sub-pixels are arranged, and liquid crystal molecules are aligned orthogonally while no voltage is applied. This also has allowed improvement in the black display quality.

Furthermore, CPA (Continuous Pinwheel Alignment) mode has also been accomplished, which is a further development of the MVA mode; a rivet that projects out perpendicularly to the liquid crystal layer serves as the alignment control structure, so as to cause the liquid crystal molecules to be aligned in a radial manner upon applying a voltage. Unlike the MVA mode, in the CPA mode, the alignment control structure causes no interference at the time when no voltage is applied. Hence the CPA mode has excellent vertical alignment, and has particularly excellent black display quality.

FIG. 18 is a plan view of a panel of a liquid crystal display disclosed in Patent Literature 1, as one example of a liquid crystal display including a liquid crystal layer that is driven by the VA mode.

Gate bus lines 12, drain bus lines 14, and storage capacitor bus lines 18 are provided on a TFT substrate 2. Further, on the TFT substrate 2, pixels connected to the gate bus lines 12 and drain bus lines 14 via a TFT 20 are disposed thereon in a matrix state. Each of the pixels includes a pixel electrode 16, and data signals are written into each of the pixel electrodes 16 from the drain bus lines 14 via a drain electrode 21 and source electrode 22 of the TFT 20. Moreover, the pixel electrodes 16 are connected to storage capacitor electrodes 19. The storage capacitor electrodes 19 and storage capacitor bus lines 18 are aligned parallel with each other, to form a storage capacitance.

Further, at intersecting positions of the gate bus lines 12 and drain bus lines 14, and at intersecting positions of the storage capacitor bus lines 18 and drain bus lines 14, projections 40 that serve as alignment control structures are formed. The projections 40 are formed of resist or the like, and are shaped substantially round when the projection is seen from a direction perpendicular to the substrate surface.

CITATION LIST

Patent Literature 1
Japanese Patent Application Publication, Tokukai, No. 2004-93826 A (Publication Date: Mar. 25, 2004)

SUMMARY OF INVENTION

However, the VA mode liquid crystal display that uses the conventional alignment control structure has a problem that, with pixel electrodes that are applied a voltage separately from each other, it is difficult to control an alignment state of liquid crystal molecules upon application of a voltage to the liquid crystal layer, so that the liquid crystal molecules are uniformly arranged between the pixel electrodes.

The following description explains this difficulty in alignment control, with reference to FIG. 19. FIG. 19 is a plan view of pixel electrodes 101 of a pixel in which liquid crystal is driven by the MVA mode, particularly the CPA mode. Each of the pixel electrodes 101 are rectangular shaped that extends longer in a direction A in which data signal lines extend. A rivet 102a that serves as an alignment control structure is disposed at a central position of each of the pixel electrodes 101 in a projecting manner, on a counter electrode so as to project into the liquid crystal layer. Further, between two of the pixel electrodes 101 and 101 that are disposed adjacent to each other in a direction A, a slit 102b is provided, which extends in a direction perpendicular to the direction A. Upon application of a voltage to the liquid crystal layer, liquid crystal molecules fall in a radial manner having the rivet 102a serve as a center, due to a fringe electric field. Since the liquid crystal molecules fall in the radial manner, some of relations between a long axis of the liquid crystal molecules and a transmission axis of a polarizing plate show a crosswise black-line pattern 201 that has an extinction pattern as illustrated in FIG. 19. This pattern is observable through an optical microscope by using linearly polarized light.

These black-lines extend from the rivet 102a that serves as the center, and a black-line 201a that is a black-line extending along the direction A in which the data signal lines extend and extending towards a pixel electrode edge that serves as a borderline with the slit 102b has a starting point 103 at the pixel electrode edge side. This starting point 103 varies in position, between pairs of pixel electrodes that are adjacent to each other. This indicates that, in the vicinity of the slit 102b, as circled with the broken lines, the alignment center 104 that are provided common within a pair of adjacent pixel electrodes at tips of the black-lines 201a are generated in a varying manner between other pairs of pixel electrodes adjacent thereto, and thus is unstable.

Moreover, this problem occurs similarly in a case where just one of the two pixel electrodes that sandwich the slit 102b has an alignment control structure such as the rivet 102a.

Such unevenness in alignment between pixel electrodes causes roughness or the like in display. As a result, display quality deteriorates.

The foregoing example provides a description of a CPA mode, however liquid crystals of the VA mode which use an alignment control structure generally has an alignment center that determines a direction towards which liquid crystal molecules fall. Therefore, the problem that alignment centers of liquid crystal molecules are not generated uniformly between pixels, which alignment center is generated in the vicinity of a slit sandwiched between pixel electrodes that are provided adjacent to each other in a direction in which the data signal lines extend and that are applied a voltage separately, is a problem that occurs generally with liquid crystals of the VA mode.

The present invention is accomplished in view of the foregoing conventional problem, and its object is to achieve a liquid crystal display that is capable of generating alignment centers of liquid crystal molecules so that alignment centers of pairs of adjacent pixel electrodes are generated in uniform, which alignment center is generated in the vicinity of a slit sandwiched between pixel electrodes that are provided adjacent to each other in a direction in which the data signal lines extend and that are applied a voltage separately.

In order to attain the object, a liquid crystal display of the present invention is a liquid crystal display including: a liquid crystal layer driven by a vertical alignment mode; and pixel electrodes, each two pixel electrodes being disposed adjacent to each other in a first direction so as to sandwich a slit therebetween, the two pixel electrodes separately accepting writing-in of data signals, the first direction being a direction in which data signal lines extend, and the liquid crystal layer, corresponding to at least one of the two pixel electrodes, having an alignment control structure disposed on its counter electrode, one pixel electrode of the two pixel electrodes having a first edge being an edge serving as a borderline between the one pixel electrode and the slit, and the other pixel electrode of the two pixel electrodes having a second edge being an edge serving as a borderline between the other pixel electrode and the slit, the first edge and the second edge being not uniformly parallel to each other along a direction that is perpendicular to the first direction, the first edge and the second edge sharing a bisector that extends along the first direction and runs through centers of the first edge and the second edge, one or both of the first edge and the second edge having a protrusion provided extending into the slit in the first direction, the protrusion(s) being increased just along a direction from a region on one predetermined side of the bisector to another region on the other side of the bisector, the region on one predetermined side of the bisector and the another region on the other side of the bisector being regions on the first and second edges on which the protrusion(s) are provided, and all of the protrusion(s) being extended into the slit to reach its maximum in the another region on the other side of the bisector.

According to the invention, a protrusion provided on an edge is always provided on a predetermined side in a lopsided manner. As a result, positions at which alignment centers generate, which alignment centers are present in the vicinity of slits common in pairs of pixel electrodes adjacent to each other, are identical between each other.

According to the above, it is possible to generate alignment centers of liquid crystal molecules uniform with adjacent pairs of pixel electrodes, in the vicinity of a slit that is sandwiched between pixel electrodes that are adjacent to each other in a direction in which the data signal line extends and that are applied a voltage separately.

In order to attain the object, a liquid crystal display of the present invention is arranged in such a manner that the protrusion is provided on both the first edge and the second edge.

According to the invention, the protrusion is provided on an edge of each of the pixel electrodes of the pair of pixel electrodes adjacent to each other. Thus, it is possible to easily make an alignment state of liquid crystal molecules same between adjacent pixel electrodes, thereby attaining an even display quality throughout a panel.

In order to attain the object, a liquid crystal display of the present invention is arranged in such a manner that the pixel electrodes are paired so as to form pairs of the two pixel electrodes disposed adjacent to each other, and in each of the pairs of the two pixel electrodes, the protrusion is provided on an edge of just one pixel electrode of the paired two pixel electrodes.

According to the invention, a large protrusion is provided on an edge of just one pixel electrode of the pairs of the two pixel electrodes disposed adjacent to each other. Hence, an alignment center of liquid crystal molecules is generated at a position particularly stable.

In order to attain the object, a liquid crystal display of the present invention is arranged in such a manner that the pairs of the pixel electrodes are disposed adjacent to each other in such a manner that the protrusion is provided alternately on the first edge and the second edge in the pairs of the pixel electrodes.

According to the invention, the edges of the pixel electrodes on which the protrusions are provided are alternated between the pairs of the pixel electrodes. Hence, it is possible to level a difference in alignment state of liquid crystal molecules between two pixel electrodes within the pair of the pixel electrodes, between the other pairs of the pixel electrodes. Thus, it is possible to attain an even display quality throughout the panel.

In order to attain the object, a liquid crystal display of the present invention is arranged in such a manner that the protrusion is formed by having a protruding end that protrudes uniformly into the slit in the first direction.

According to the invention, it is possible to easily form a protrusion that allows easy determination of an alignment center.

In order to attain the object, a liquid crystal display of the present invention is arranged in such a manner that the protrusion is provided on both the first edge and the second edge, and the protruding end of the protrusion on the first edge and the protruding end of the protrusion on the second edge face each other.

According to the invention, an alignment center of liquid crystal molecules that is common between two pixels corresponding to a pair of pixel electrodes adjacent to each other is at a position on a slit in the vicinity of where a projecting angle formed by a protruding end of a protrusion on the first edge and a projecting angle formed by a protruding end of a protrusion on the second edge face each other, in a position other than an end section of the first edge and second edge. Therefore, a position where an alignment center is generated commonly at a tip of extinction patterns of a pair of pixel electrodes adjacent to each other are uniform with other pairs of pixel electrodes adjacent to each other.

In order to attain the object, a liquid crystal display of the present invention is arranged in such a manner that the pixel electrodes are paired so as to form pairs of the two pixel electrodes disposed adjacent to each other, and in each of the pairs of the two pixel electrodes, the protrusion is provided on an edge of just one pixel electrode of the paired two pixel electrodes.

According to the invention, an alignment center of liquid crystal molecules that is common between two pixels corresponding to a pair of the two of the pixel electrodes is at a position on a slit which position is adjacent to a projecting angle formed by a protruding end of a protrusion, in a position other than one of an end section of the first edge and second edge. Therefore, a position where an alignment center is generated commonly at a tip of extinction patterns of a pair of the pixel electrodes disposed adjacent to each other is uniform with other pairs of the pixel electrodes.

In order to attain the object, a liquid crystal display of the present invention is arranged in such a manner that the pairs of the pixel electrodes are disposed adjacent to each other in such a manner that the protrusion is provided alternately on the first edge and the second edge in the pairs of the pixel electrodes.

According to the invention, the edges of the pixel electrodes on which the protrusions are provided are alternated between the pairs of adjacent pixel electrodes. Hence, it is possible to level a difference in alignment state of liquid crystal molecules between two pixel electrodes within the pair of the pixel electrodes, between the other pairs of the pixel electrodes. Thus, it is possible to attain an even display quality throughout the panel.

In order to attain the object, a liquid crystal display of the present invention is arranged in such a manner that the first edge and the second edge have an oblique edge that is linearly and monotonously oblique with respect to a direction that is perpendicular to the first direction, the oblique edge gradually protruding into the slit in the first direction.

According to the invention, an oblique edge is used as the protrusion. This makes a pixel electrode area larger than that in a case where a projecting protrusion is used, thereby allowing improvement in display brightness.

In order to attain the object, a liquid crystal display of the present invention is arranged in such a manner that the protrusion is formed just by the oblique edge.

According to the invention, the protrusion is easily formed.

In order to attain the object, a liquid crystal display of the present invention is arranged in such a manner that the protrusion is formed by (i) the oblique edge and (ii) a protruding end that is uniformly protruding by an amount of a maximum protruding point of the oblique edge, the protruding end being connected to the maximum protruding point of the oblique edge.

According to the invention, it is possible to easily form a protrusion that allows easy determination of an alignment center.

In order to attain the object, a liquid crystal display of the present invention is arranged in such a manner that the protruding end of the protrusion on the first edge and the protruding end of the protrusion on the second edge face each other.

According to the invention, an alignment center of liquid crystal molecules that is common to two pixels corresponding to a pair of pixel electrodes adjacent to each other is generated around a position on a slit that is adjacent to a projecting angle formed by a protruding end at a maximum protruding point of the oblique edge on the first edge and a projecting angle formed by a protruding end at a maximum protruding point of the oblique edge on the second edge. Therefore, a position where an alignment center is generated commonly at a tip of extinction patterns of a pair of pixel electrodes adjacent to each other are uniform with other pairs of pixel electrodes adjacent to each other.

In order to attain the object, a liquid crystal display of the present invention is arranged in such a manner that the alignment control structure is a rivet.

According to the invention, an alignment center position is stabilized in a case where a rivet is used as the alignment control structure.

In order to attain the object, a liquid crystal display of the present invention is arranged in such a manner that the alignment control structure is a hole opened in the counter electrode.

According to the invention, an alignment center position is stabilized in a case where a hole opened in a counter electrode is used as the alignment control structure.

In order to attain the object, a liquid crystal display of the present invention is arranged in such a manner that the alignment control structure is a slit provided in the counter electrode.

According to the invention, an alignment center position is stabilized in a case where a slit is used as the alignment control structure.

In order to attain the object, a liquid crystal display of the present invention is arranged in such a manner that the alignment control structure is a rib.

According to the invention, an alignment center position is stabilized in a case where a rib is used as the alignment control structure.

For a fuller understanding of the nature and advantages of the invention, reference should be made to the ensuing detailed description taken in conjunction with the accompanying drawings.

REFERENCE SIGNS LIST 51 liquid crystal display
61, 71, 81, 91, 92, 93, 94
  pixel electrode
61a, 71a, 81a, 91a, 92a, 93a, 94a
  edge (first edge)
61b, 71b, 81b, 91b, 92b, 93b, 94b
  edge (second edge)
62a, 72a rivet (alignment control structure)
62b, 72b, 82b slit
C bisector
SL data signal line
A direction (direction in which data signal lines extend, first direction)

DESCRIPTION OF EMBODIMENTS

One embodiment of the present invention is described below, with reference to FIGS. 1 to 17.

Figure 17:
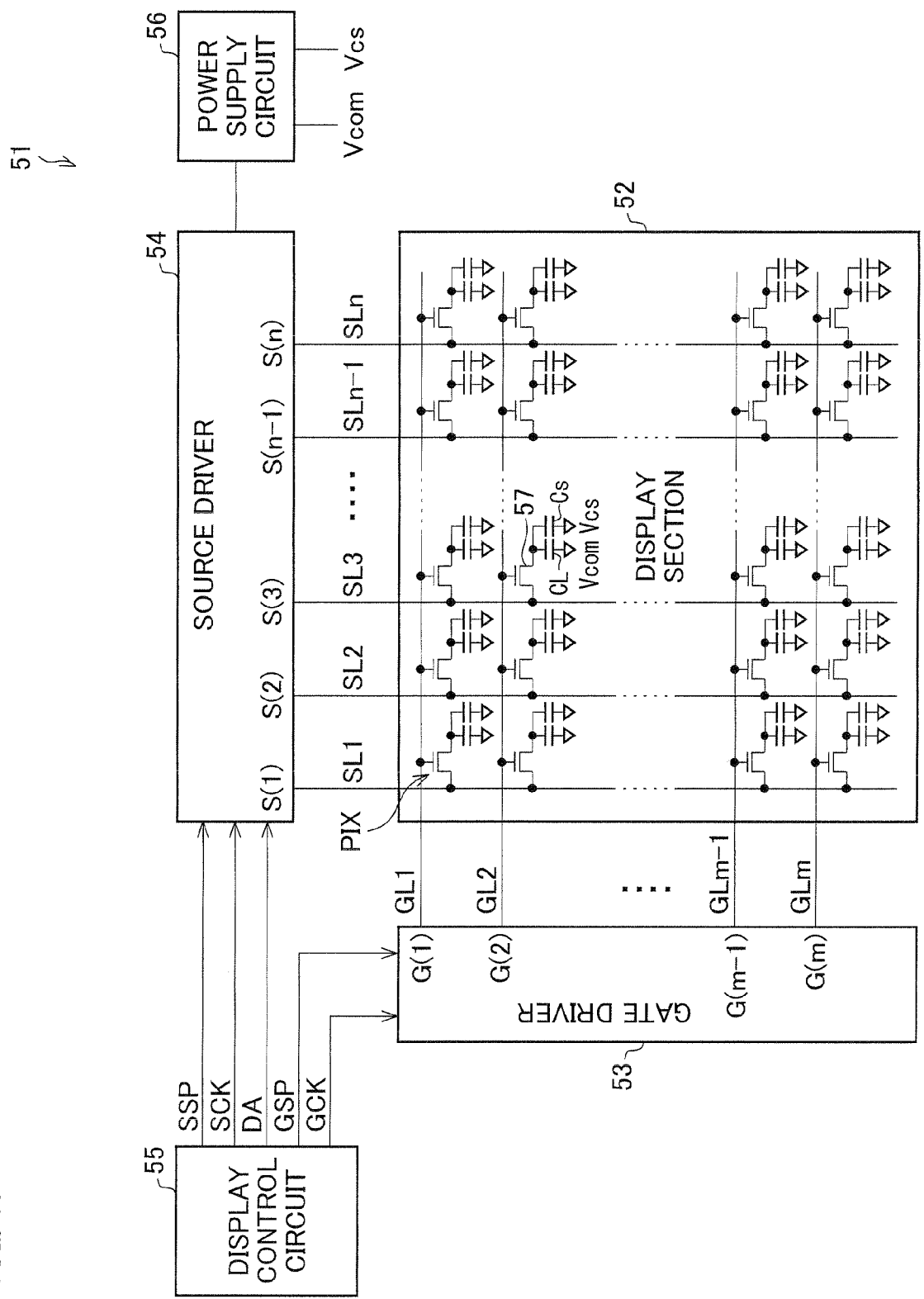
FIG. 17 illustrates an embodiment of the present invention, and is a block diagram illustrating a configuration of a liquid crystal display.
Figure 18:
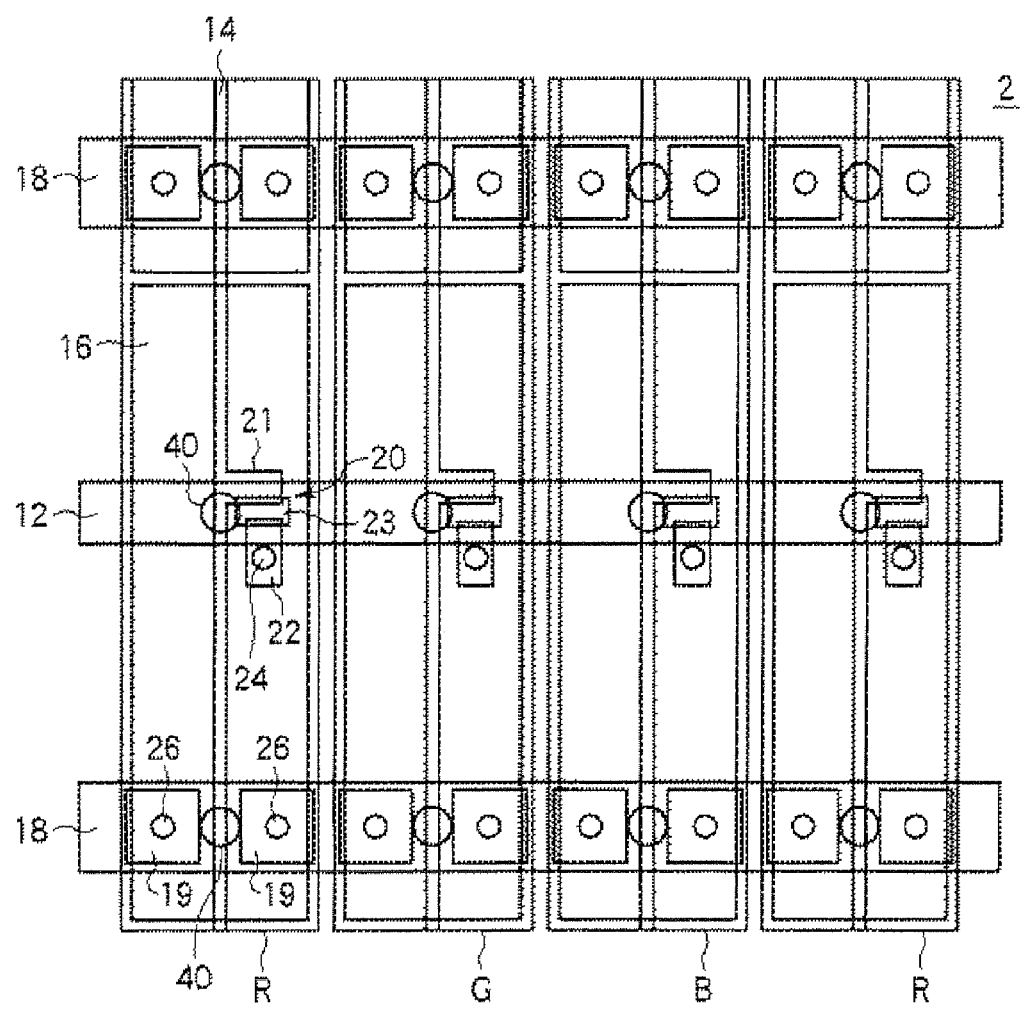
FIG. 18 illustrates a conventional technique, and is a plan view illustrating a pixel configuration.
Figure 19:
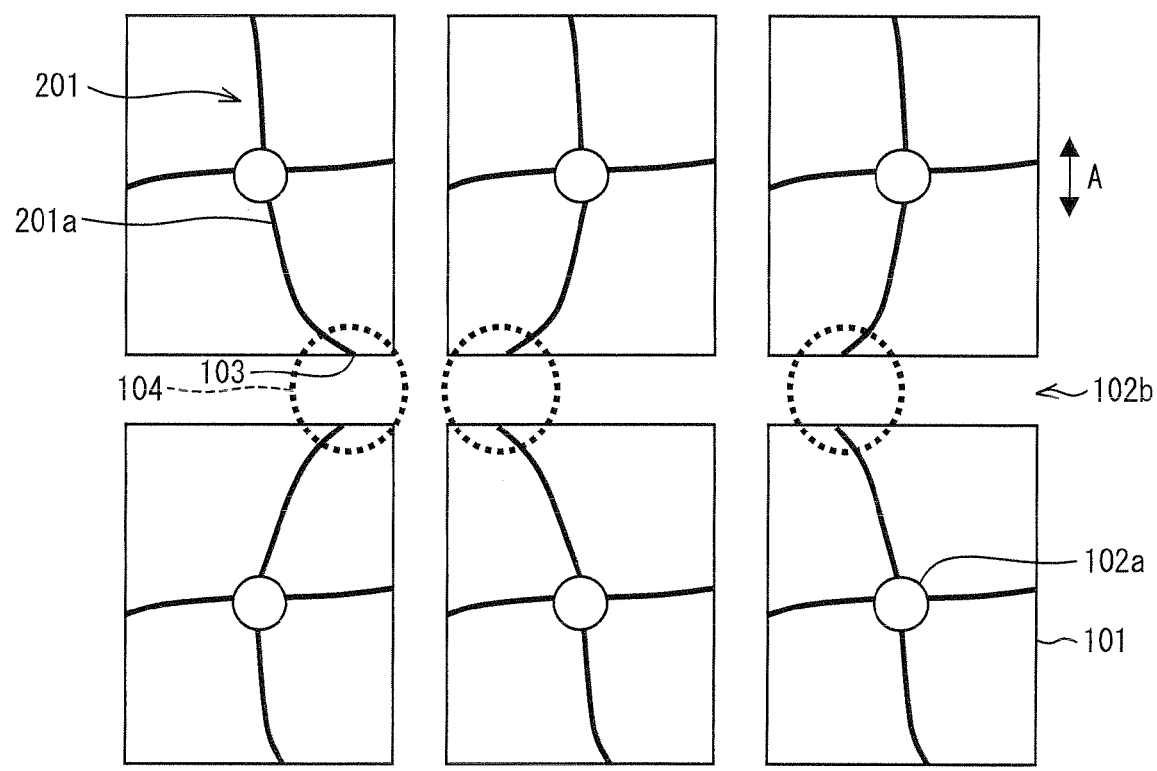
FIG. 19 illustrates a conventional technique, and is a plan view illustrating that positions of generated alignment centers of liquid crystal molecules are not stable.

FIG. 17 illustrates a configuration of a liquid crystal display 51 according to the present embodiment.

The liquid crystal display 51 is a display of an active matrix type, and includes: a gate driver 53 serving as a scanning signal line drive circuit; a source driver 54 serving as a data signal line drive circuit; a display section 52; a display control circuit 55 for controlling the gate driver 53 and source driver 54; and a power supply circuit 56.

The display section 52 includes: gate lines GL1 to GLm serving as a plurality of (m) scanning signal lines; source lines SL1 to SLn serving as a plurality of (n) data signal lines that intersect with the gate lines GL1 to GLm; and a plurality of (m×n) pixels PIX . . . that are provided at intersections of the gate lines GL1 to GLm and source lines SL1 to SLn, respectively. Moreover, although not illustrated in FIG. 17, the display section 52 includes storage capacitor lines that run parallel to the gate lines GL1 to GLm.

The plurality of pixels PIX . . . are provided in a matrix form so as to configure a pixel array. Each of the pixels PIX include a TFT 57, a liquid crystal capacitor CL, and a storage capacitor Cs. The TFT 57 has its gate electrode connected to a gate line GLj ($1 \leq j \leq m$), its source electrode connected to a source line SLi ($1 \leq i \leq n$), and its drain electrode connected to a pixel electrode. The liquid crystal capacitor CL is constructed of a pixel electrode and a counter electrode, and a liquid crystal layer sandwiched between the pixel electrode and the counter electrode. A voltage Vcom is applied to the counter electrode from a power supply circuit 56. The liquid crystal capacitor CL and the storage capacitor Cs make up a pixel capacitance, however as another capacitor to make up the pixel capacitor, a parasitic capacitance is also present, which is formed between the pixel electrode and lines that are disposed close to the pixel capacitor.

Figure 1:
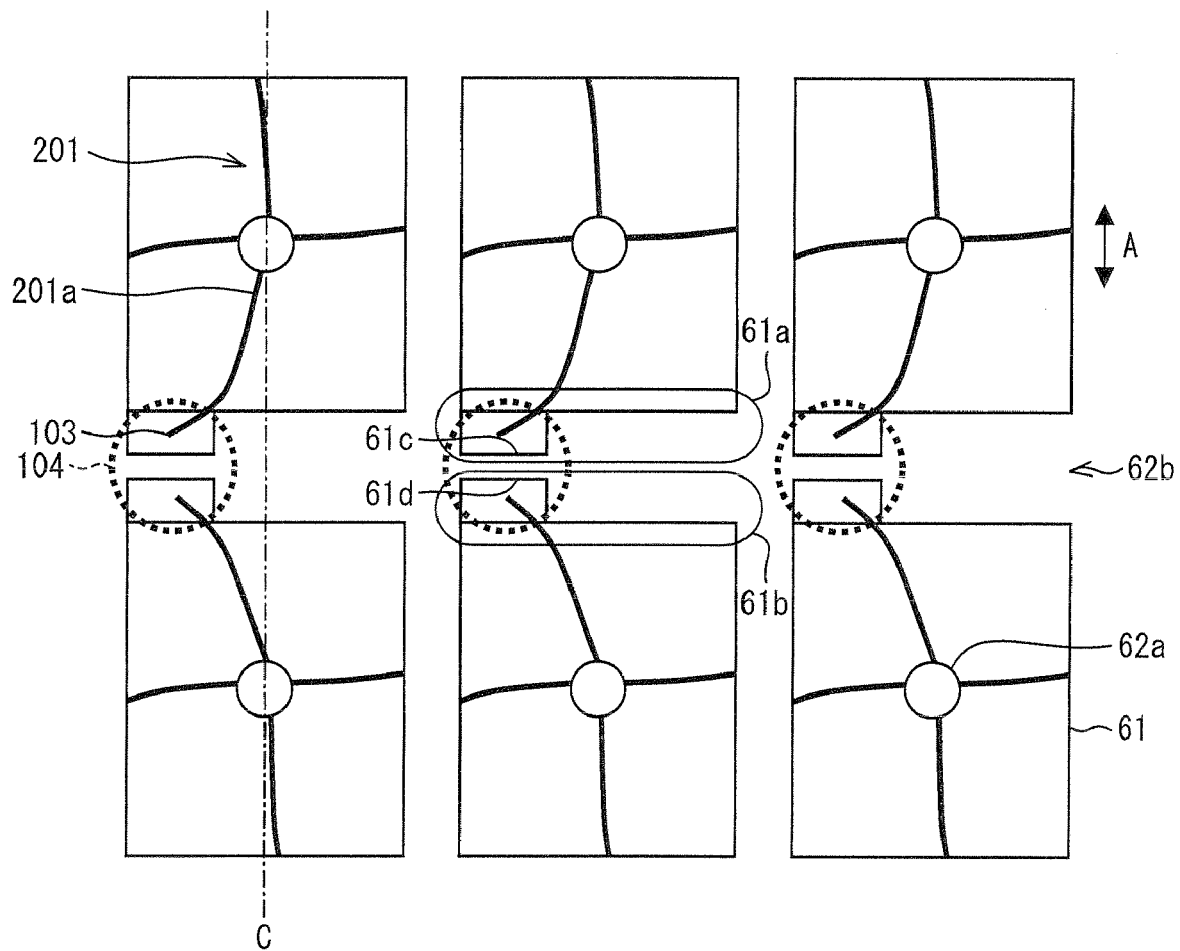
FIG. 1 illustrates an embodiment of the present invention, and is a plan view illustrating a first form of a pixel electrode in a liquid crystal display.

Next, FIG. 1 illustrates a plan view of pixel electrodes 61 regarding a pixel PIX in which a liquid crystal is driven by MVA mode, particularly CPA mode. The pixel electrodes 61 are, as a whole, shaped to be long in a direction (first direction) A in which the data signal lines extend. A rivet 62a serving as an alignment control structure is disposed in a central position of each of the pixel electrodes 61, so as to project into the liquid crystal layer, from the counter electrode. Further, two pixel electrodes 61 and 61 that are provided adjacently in the direction A sandwich a slit 62b that extends perpendicularly to the direction A.

One of the two pixel electrodes 61 and 61 that sandwich the slit 62b has a protruding end 61c on an edge (first edge) 61a that serves as a borderline with the slit 62b, which protruding end 61c protrudes into the slit 62b in the direction A in a projecting manner. The other one of the two pixel electrodes has a protruding end 61d on an edge (second edge) 61b that serves as a borderline with the slit 62b, which protruding end 61d uniformly protrudes into the slit 62b in the direction A in a projecting manner. Moreover, the protruding end 61c is provided on the edge 61a lopsided in just one region on one side of a bisector C running along the direction A, in such a manner that the protruding end 61c is in line with one end of the edge 61a. Furthermore, the protruding end 61d is provided on the edge 61b lopsided in just one region on one side of the bisector C running along the direction A, in such a manner that the protruding end 61d is in line with one end of the edge 61b. Furthermore, the protruding end 61c and protruding end 61d face each other.

In this way, the edge 61a and the other edge 61b of the two pixel electrodes 61 and 61 that are adjacent to each other and sandwich the slit 62b therebetween are not uniformly parallel along a direction perpendicular to the direction A. Moreover, the protrusions formed on both of the edge 61a and edge 61b extending into the slit 62b in the direction A is increased just along a direction from the right side to the left side of the drawing, that is, from a region on a predetermined one side of a bisector C to a region on the other side of the bisector C, which bisector C runs along the direction A and is shared by the edges 61a and 61b and which region on one predetermined side of the bisector C and the another region on the other side of the bisector C are regions on the edges 61a and 61b, and both the protrusions on the edges 61a and 61b are extended into the slit to reach its maximum in the another region on the other side of the bisector C.

In the configuration of FIG. 1, a crosswise black-line pattern 201 that shows an extinction pattern and extends from the rivet 62a that serves as a center has a black-line 201a that is a black-line running along the direction A in which the data signal line extends. The black-line 201a extends to a pixel electrode edge that serves as a border with the slit 62b, and has a starting point 103 that is positioned on the pixel electrode edge in the vicinity of the protruding end 61c or protruding end 61d, for each of the pixel electrodes 61. This indicates that in the vicinity of the slit 62b, as illustrated by the broken line circle, positions of the alignment center 104 that are generated commonly at a tip of the black-lines 201a in pairs of pixel electrodes adjacent to each other are identical between each other.

Therefore, with the configuration of FIG. 1, it is possible to generate alignment centers of liquid crystal molecules uniform with adjacent pairs of pixel electrodes, in the vicinity of a slit that is sandwiched between pixel electrodes that are adjacent to each other in a direction in which the data signal line extends and that are applied a voltage separately.

Moreover, according to the configuration of FIG. 1, the protrusion is provided on an edge of each of the pixel electrodes of the pair of pixel electrodes adjacent to each other. Thus, it is possible to easily make an alignment state of liquid crystal molecules same between adjacent pixel electrodes, thereby attaining an even display quality throughout a panel.

Figure 2:
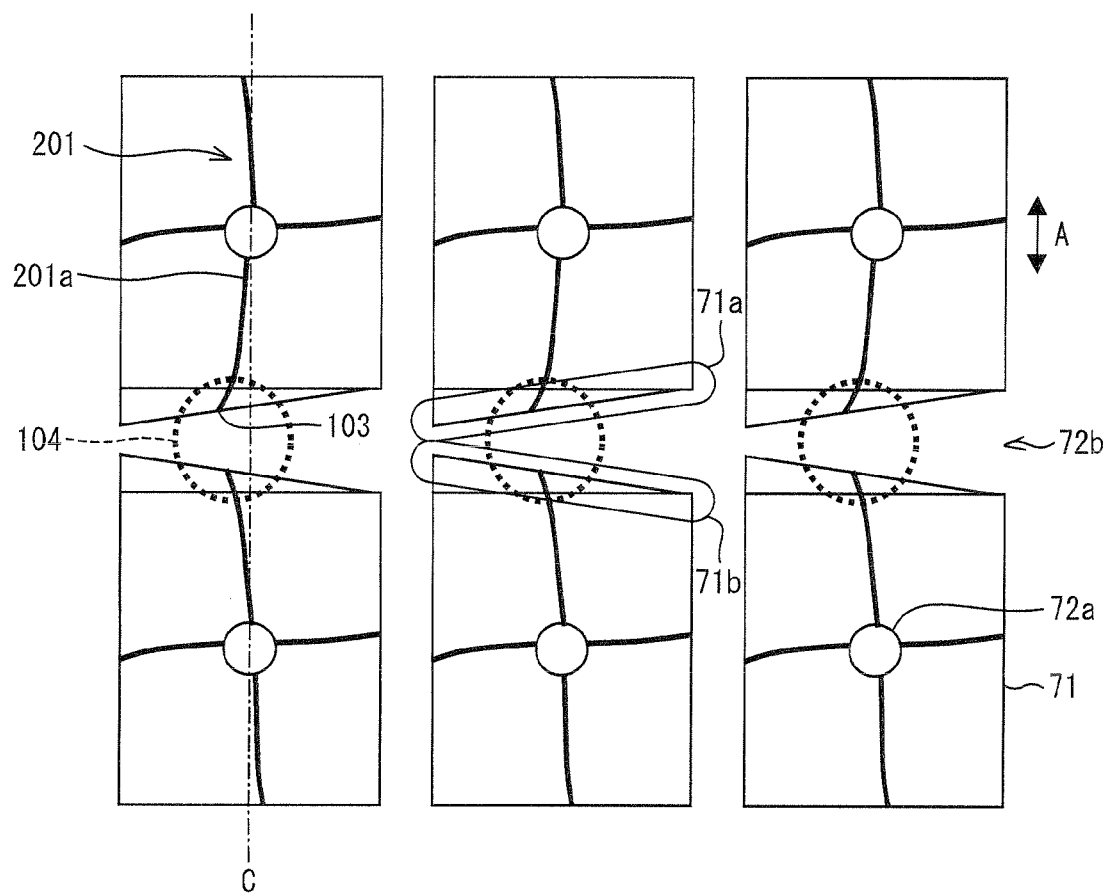
FIG. 2 illustrates an embodiment of the present invention, and is a plan view illustrating a second form of a pixel electrode in a liquid crystal display.

FIG. 2 is a plan view illustrating another pixel electrodes 71 of a pixel PIX in which a liquid crystal is driven by MVA mode, particularly by CPA mode. Each of the pixel electrodes 71 as a whole is shaped to be long in a direction A in which the data signal lines extend. At a position in a central section of each of the pixel electrodes 71, a rivet 72a that serves as an alignment control structure is provided projecting from the counter electrode into the liquid crystal layer. Two pixel electrodes 71 and 71 disposed adjacent to each other in a direction A sandwiches a slit 72b that extends perpendicularly to the direction A.

In the embodiment, one of the two pixel electrodes 71 and 71 that are adjacent to each other and sandwich the slit 72b therebetween has an edge (first edge) 71a that serves as a borderline with the slit 72b. This edge 71a is oblique in a linear and monotonous manner with respect to the direction in which the slit 72b extends, and gradually protrudes into the slit 72b. The other one of the pixel electrodes has an edge (second edge) 71b that serves as a borderline with the slit 72b. This edge 71b is oblique in a linear and monotonous manner with respect to the direction in which the slit 72b extends, and gradually protrudes into the slit 72b. The edge 71a and edge 71b have their parts of the protrusions that largely protrude into the slit 72b face each other.

As a result, the one edge 71a and the other edge 71b of the two pixel electrodes 71 and 71, which pixel electrodes are adjacent to each other and sandwich the slit 72b therebetween, are not uniformly parallel to each other in a direction perpendicular to the direction A. Moreover, the protrusions formed on the edges 71a and 71b extending into the slit 72b in the direction A is increased just along a direction from the right side to the left side of the drawing, that is, from a region on a predetermined one side of a bisector C to a region on the other side of the bisector C, which bisector C runs along the direction A and is shared by the edges 71a and 71b and which region on one predetermined side of the bisector C and the another region on the other side of the bisector C are regions on the edges 71a and 71b, and both the protrusions on the edges 71a and 71b are extended into the slit to reach its maximum in the another region on the other side of the bisector C.

In the configuration of FIG. 2, a crosswise black-line pattern 201 that shows an extinction pattern and extends from the rivet 72a that serves as a center has a black-line 201a that is a black-line running along the direction A in which the data signal line extends. The black-line 201a extends to a pixel electrode edge that serves as a border with the slit 72b, and has a starting point 103 lopsidedly located in the vicinity of a side in which the position of the starting point 103 is protruding more into the slit 72b of the edge 71a or 71b, for each of the pixel electrodes 71. This indicates that in the vicinity of the slit 72b, as illustrated by the broken line circle, positions of the alignment center 104 that are generated commonly at a tip of the black-lines 201a in pairs of pixel electrodes adjacent to each other are identical between each other.

Therefore, with the configuration of FIG. 2, it is possible to generate alignment centers of liquid crystal molecules uniform with adjacent pairs of pixel electrodes, in the vicinity of a slit that is sandwiched between pixel electrodes that are adjacent to each other in a direction in which the data signal line extends and that are applied a voltage separately.

Moreover, according to the configuration of FIG. 2, the shape and size of the protrusion on the edge of the pixel electrodes of the pair of pixel electrodes adjacent to each other are identical to each other. Thus, it is possible to easily make an alignment state of liquid crystal molecules same between the adjacent pixel electrodes, thereby attaining an even display quality throughout a panel.

Moreover, the configuration in FIG. 2 uses an oblique edge as the protrusion. This allows increasing an area of the pixel electrode as compared to a case where a projecting protrusion is used. Hence, it is possible to improve brightness of the display device.

In FIG. 1 and FIG. 2, the protrusion on the edge is provided on both the two adjacent pixel electrodes. However, the configuration is not limited to this, and the protrusion on the edge may be just provided on one of the pixel electrodes. In this case, the protrusion into the slit 62b and 72b in the direction A on one of the edges is sufficient as long as the protrusion is increased along just a direction from a region in a predetermined one side of a bisector C to another region on the other side of the bisector C, which bisector C runs along the direction A and is shared by the edges of the two adjacent pixel electrodes.

Figure 4:
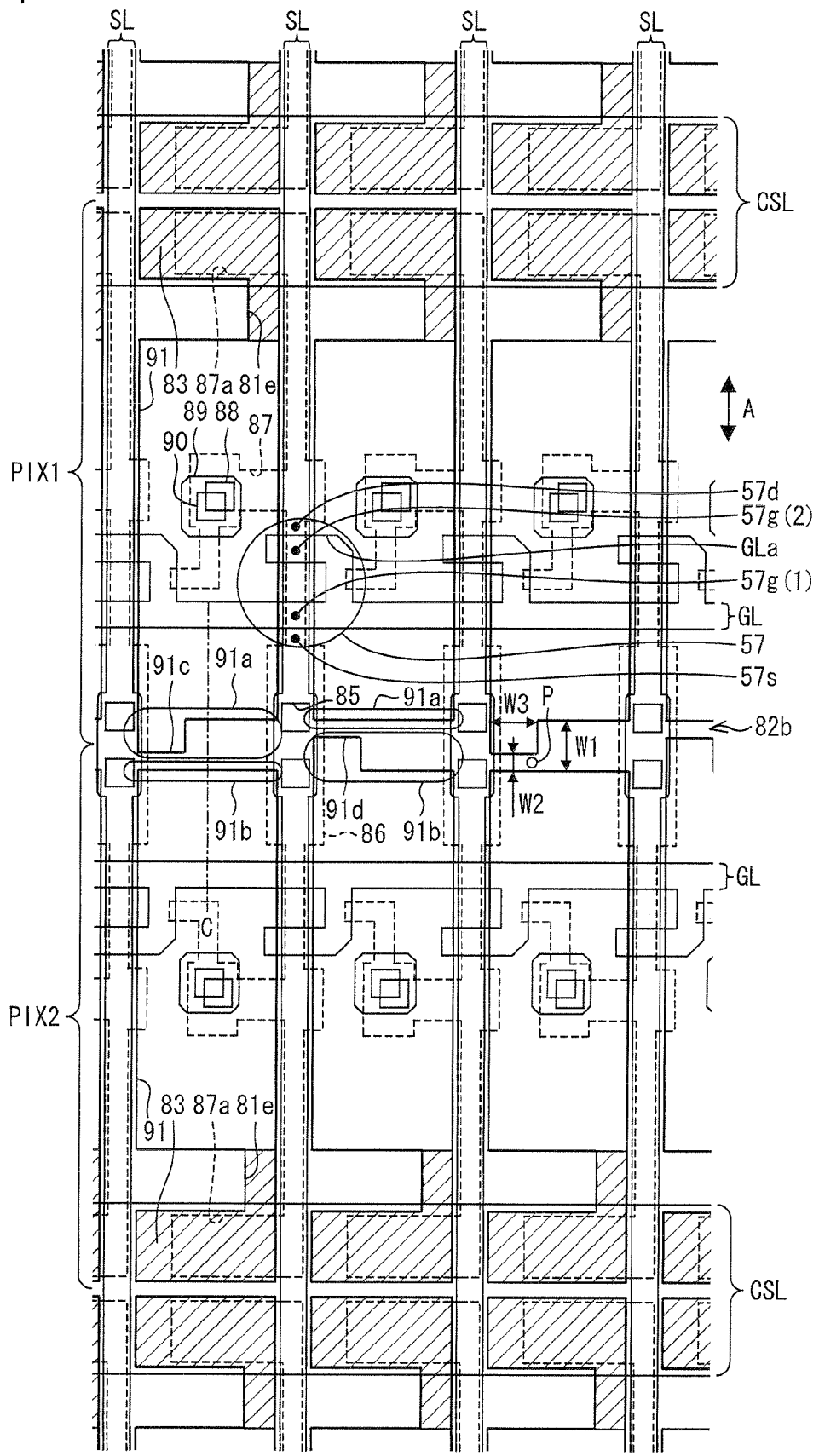
FIG. 4 illustrates an embodiment of the present invention, and is a plan view illustrating a fourth form of a pixel electrode of a liquid crystal display, which is applied in a specific pixel arrangement.
Figure 5:
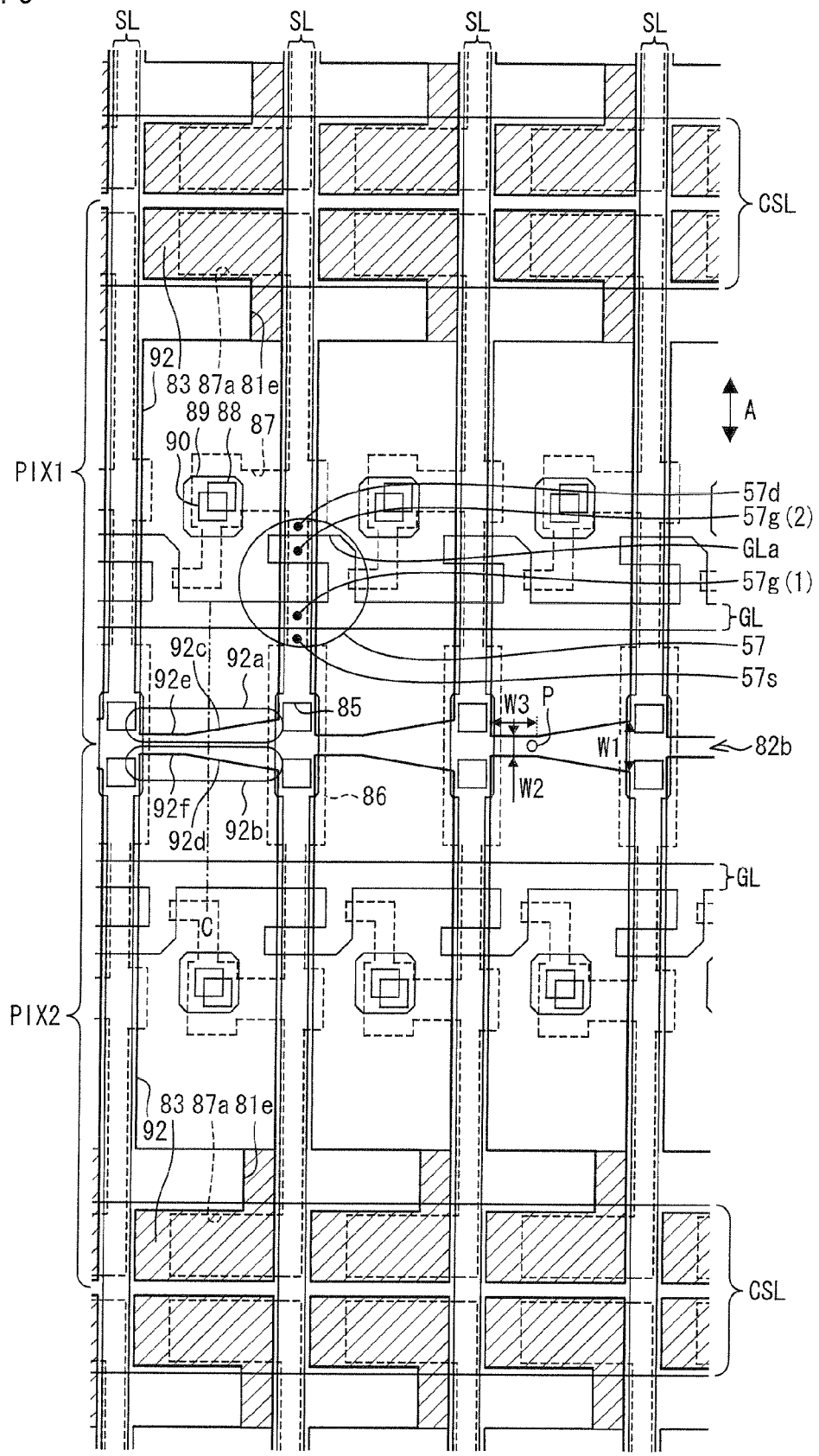
FIG. 5 illustrates an embodiment of the present invention, and is a plan view illustrating a fifth form of a pixel electrode of a liquid crystal display, which is applied in a specific pixel arrangement.
Figure 6:
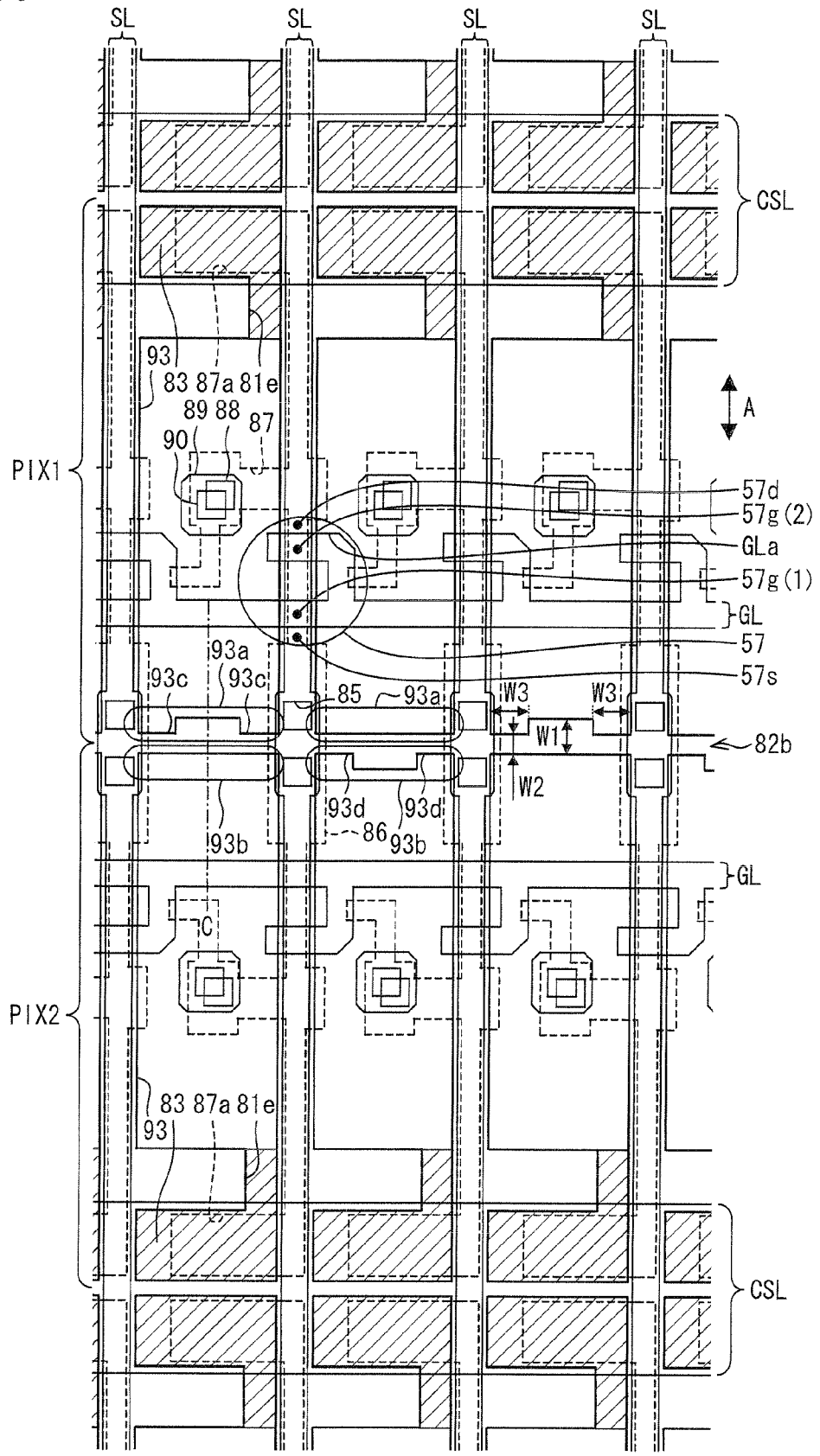
FIG. 6 illustrates an embodiment of the present invention, and is a plan view illustrating a form of a first comparative example of a pixel electrode in a liquid crystal display, which is applied in a specific pixel arrangement.
Figure 7:
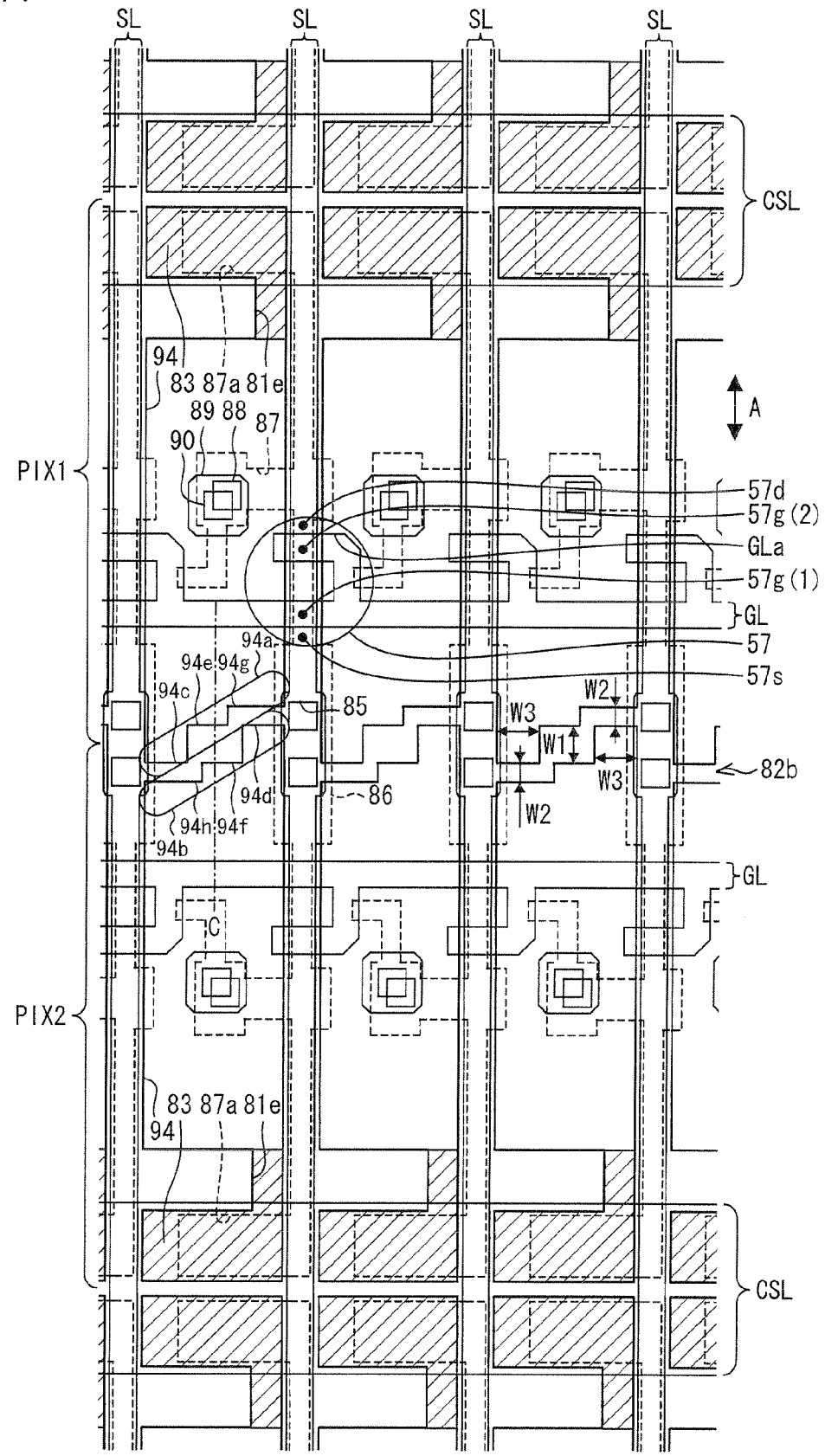
FIG. 7 illustrates an embodiment of the present invention, and is a plan view illustrating a form of a second comparative example of a pixel electrode in a liquid crystal display, which is applied in a specific pixel arrangement.

Next describes a configuration of a pixel electrode including the features of the present invention, which is applied into a specific pixel configuration, with reference to FIGS. 3 to 7. FIG. 6 and FIG. 7 are comparative examples.

Figure 3:
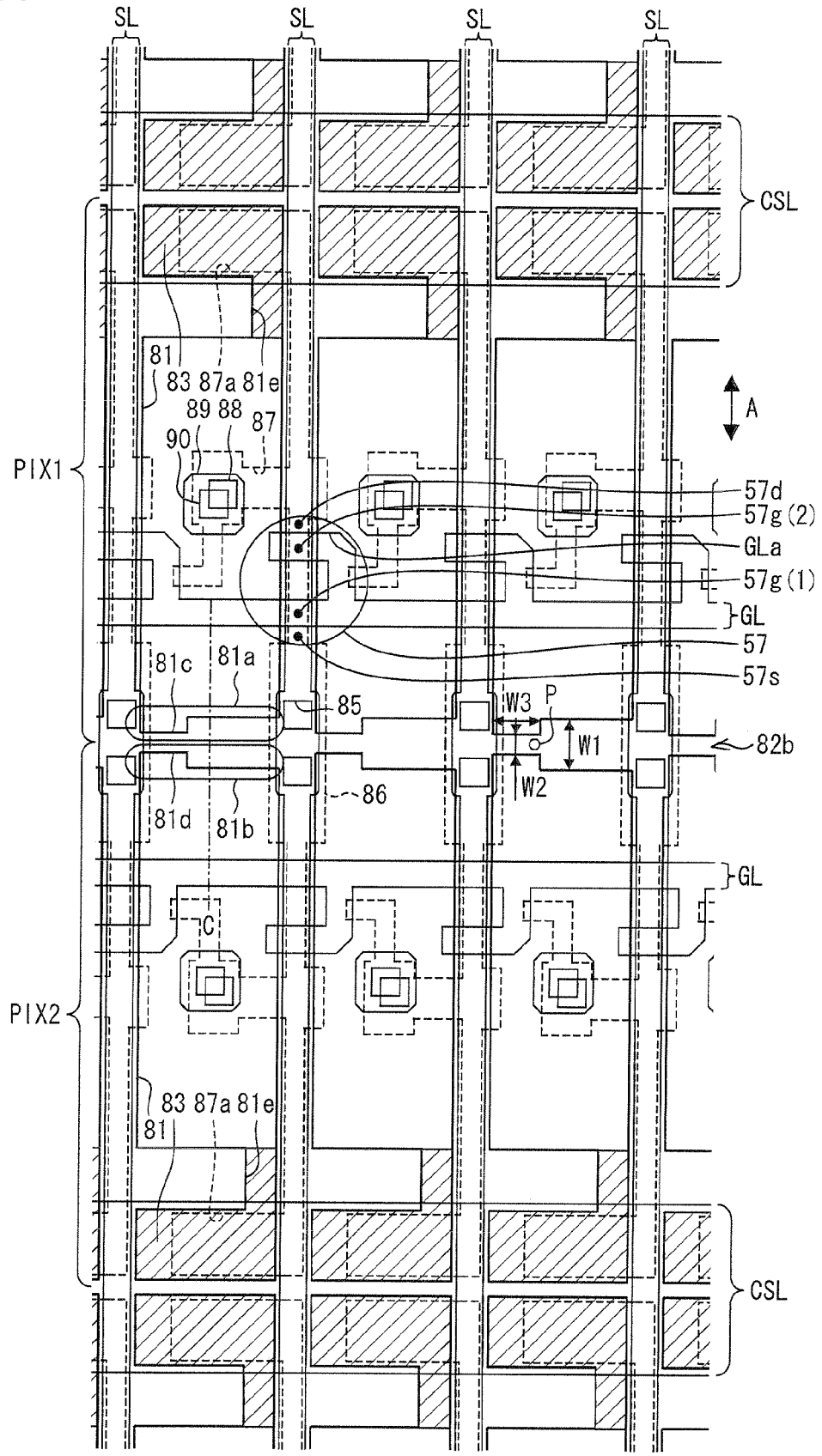
FIG. 3 illustrates an embodiment of the present invention, and is a plan view illustrating a third form of a pixel electrode of a liquid crystal display, which is applied in a specific pixel arrangement.

FIG. 3 is a plan view illustrating pixels PIX that each include a pixel electrode of a first configuration.

Two pixels PIX are disposed in each of regions that are partitioned by two adjacent source lines SL and two adjacent storage capacitor lines CSL. One of the pixels is called pixel PIX1, and the other one of the pixels is called pixel PIX2. A pixel electrode 81 of the pixel PIX1 and a pixel electrode 81 of the pixel PIX2 make up one pair of adjacent pixel electrodes. Gate lines GL of the pixels PIX1 and PIX2 are disposed below the pixel electrodes 81, and the storage capacitor lines CSL are provided parallel to the gate lines GL.

In this embodiment, the pixels PIX1 and PIX2 have a transmissive display region and a reflective display region. A reflective electrode 83 is disposed directly above a part of a region of the pixel electrode 81 made of a transparent electrode, which reflective electrode is illustrated by slashes; the reflective display region is a region that has the reflective electrode 83, and the transmissive display region is a region of the pixel electrode 81 that does not have the reflective electrode 83. The reflective electrode 83 is substantially disposed above the storage capacitor wiring CSL, and the part of the transmissive display region of the pixel electrode 81 is provided, in both the pixels PIX1 and PIX2, on a side closer to the other one storage capacitor wiring CSL of the two storage capacitor wirings CSL and CSL, of the reflective electrode 83. The reflective display region and transmissive display region of the pixel electrode 81 are connected to each other via a narrow region 81e. This ensures that alignment of liquid crystal molecules in either region do not effect each other. Moreover, the transmissive display region has an alignment control structure such as a rivet, rib, or slit provided on a counter electrode. The alignment control structure may be provided to just one of the pixels PIX1 and PIX2. An alignment control structure may also be provided in at least one of the opposing reflective display region. The transmissive display region is larger in area than that of the reflective display region, and the transmissive display region has a long narrow shape along a direction A in which the source lines SL extend.

The pixel electrode 81 of the pixel PIX1 and the pixel electrode 81 of the pixel PIX2 are provided so as to face each other and sandwich a slit 82b that extends parallel to the gate lines GL and storage capacitor wirings CSL, which slit 82b is provided at a mid position between the two storage capacitor wirings CSL and CSL.

The pixel PIX1 and the pixel PIX2 are separately connected to respective gate lines GL. When the pixels PIX1 and PIX2 are selected by the respective gate lines GL, a data signal is written into the pixel PIX1 and the pixel PIX2 via a source line SL common to the pixels PIX1 and PIX2. As a pixel select element, a TFT 57 is provided around an intersection of the respective gate lines and the common source lines. The TFT 57 includes a first gate 57g(1), a second gate 57g(2), a source 57s, and a drain 57d. The first gate 57g(1) is disposed on the gate line GL at a part where the gate line GL intersect with the source line SL. The second gate 57g(2) is disposed on a gate line branch GLa at a part where the gate line branch GLa intersects with the source line SL. The gate line branch GLa is drawn out from the gate line GL so as to shape like a hook. The source 57s is provided by a n$^+$ layer made of Si on an opposite side of the second gate 57g(2) with respect to the first gate 57g(1), and the drain 57d is provided by a n$^+$ layer made of Si on an opposite side of the first gate 57g(1) with respect to the second gate 57g(2). On a lower side of the first gate 57g(1) and the second gate 57g(2), a channel forming region is provided, which is constructed of an i layer made of Si. The channel forming region below the first gate 57g(1) and the channel forming region below the second gate 57g(2) are connected to each other via the n$^+$ layer that is made of Si.

In each of the pixels PIX1 and pixels PIX2, the source lines SL are connected to a connection wiring 86 at a position closer to the slit 82b than the TFT 57 via a through-hole 85 opened in a first dielectric layer that is provided immediately below the source lines SL, which connection wiring 86 is provided below the first dielectric layer and below a gate dielectric layer. The connection wiring 86 is formed by an n$^+$ layer that is made of Si, and is connected to the source 57s of the TFT 57.

Moreover, in the pixel PIX1 and pixel PIX2, a drain 57d of the TFT 57 is connected to a connection wiring 87. The connection wiring 87 is formed by an n$^+$ layer that is made of Si, and is diverged and routed around to a part below the pixel electrode 81 and to a part below the storage capacitor wiring CSL that is made of a gate metal. The connection wiring 87 that is routed around below the pixel electrode 81 is connected to an interconnecting pad 89 made of source metal, via a through-hole 88 opened in the first dielectric layer provided above the connection wiring 87, which interconnecting pad 89 is provided above the first dielectric layer. Furthermore, the interconnecting pad 89 is connected to the pixel electrode 81 via a through-hole 90 opened in a second dielectric layer that is provided above the interconnecting pad 89.

On the other hand, a part of the connection wiring 87 below the storage capacitor wiring CSL is connected to a storage capacitor electrode pad 87a via a part below the source lines SL, which storage capacitor electrode pad 87a is provided below the storage capacitor wiring CSL via a gate dielectric layer. The storage capacitor electrode pad 87a and the storage capacitor wiring CSL are aligned parallel with each other, which configures a storage capacitor Cs.

In the embodiment, the pixel electrode 81 of the pixel PIX1 has a protruding end 81c that is uniformly protruded in a projecting manner into the slit 82b in the direction A, on an edge (first edge) 81a that serves as a borderline with the slit 82b. The pixel electrode 81 of the pixel PIX2 has a protruding end 81d that is uniformly protruded in a projecting manner into the slit 82b in the direction A, on an edge (second edge) 81b that serves as a borderline with the slit 82b. Moreover, the protruding end 81c is provided on the edge 81a lopsided in just one region on one side of a bisector C running along the direction A, in such a manner that the protruding end 81c is in line with one end of the edge 81a. Further, the protruding end 81d is provided on the edge 81b lopsided in just one region on one side of the bisector C running along the direction A, in such a manner that the protruding end 81d is in line with one end of the edge 81b. Furthermore, the protruding end 81c and the protruding end 81d face each other.

For example, a width W3 of the protruding ends 81c and 81d which is a direction perpendicular to the direction A is 6.5 µm, a width W1 of the slit 82b that is sandwiched between the edges 81a and 81b except for the part sandwiched between the protruding ends 81c and 81d is 8 µm, and a width W2 of the slit 82b that is sandwiched between the protruding ends 81c and 81d is 3 µm.

As such, the edge 81a of the pixel PIX1 and the edge 81b of the pixel PIX2 are not uniformly parallel to each other along the direction perpendicular to the direction A. Moreover, the protrusion formed into the slit 82b in the direction A on both of the edge 81a and edge 81b is increased just along a direction from the right side to the left side of the drawing, that is, from a region on a predetermined one side of a bisector C to a region on the other side of the bisector C, which bisector C runs along the direction A and is shared by the edges 81a and 81b and which region on one predetermined side of the bisector C and the another region on the other side of the bisector C are regions on the edges 81a and 81b, and both the protrusions on the edges 81a and 81b are extended into the slit to reach its maximum in the another region on the other side of the bisector C. In this case, an alignment center P of liquid crystal molecules common to the pixel PIX1 and pixel PIX2 is positioned on the slit 82b in the vicinity of a position where projecting angles formed by the protruding ends 81c and 81d other than the end sections on the edges 81a and 81b face each other.

As described above, with the configuration of FIG. 3, the alignment center P that is provided commonly on tips of each of the black-lines of a pair of pixel electrodes adjacent to each other is generated uniformly with other pairs of pixel electrodes. Therefore, it is possible to generate alignment centers of liquid crystal molecules uniform with adjacent pairs of pixel electrodes, in the vicinity of a slit that is sandwiched between pixel electrodes that are adjacent to each other in a direction in which the data signal line extends and that are applied a voltage separately.

Moreover, in the configuration of FIG. 3, the protrusion is provided on an edge of each of the pixel electrodes of the pair of pixel electrodes adjacent to each other. Thus, it is possible to easily make an alignment state of liquid crystal molecules same between adjacent pixel electrodes, thereby attaining an even display quality throughout a panel.

FIG. 4 illustrates a plan view of a pixel PIX that includes a pixel electrode of a second configuration.

The pixel PIX of FIG. 4 replaces the pixel electrode 81 of FIG. 3 with a pixel electrode 91.

Shapes of the pair of adjacent pixel electrodes are identical per alternate column; in one of alternate column groups, a pixel electrode 91 of the pixel PIX1 has a protruding end 91c provided on an edge (first edge) 91a that serves as a borderline with the slit 82b, which protruding end 91c uniformly protrudes in a projecting manner into the slit 82b in the direction A. A pixel electrode 91 of the pixel PIX2 has an edge (second edge) 91b that serves as a borderline with the slit 82b, which edge 91b is a straight line that is perpendicular to the direction A. The other one of the alternate column groups has a pixel electrode 91 of the pixel PIX1 having an edge (first edge) 91a that serves as a borderline with the slit 82b, which edge 91a is a straight line that is perpendicular to the direction A, and a pixel electrode 91 of a pixel PIX2 has a protruding end 91d on an edge (second edge) 91b that serves as a borderline with the slit 82b, which protruding end 91d uniformly protrudes in a projecting manner into the slit 82b in the direction A.

Moreover, the protruding end 91c is provided on the edge 91a lopsided in just one region on one side of a bisector C running along the direction A, in such a manner that the protruding end 91c is in line with one end of the edge 91a. Furthermore, the protruding end 91d is provided on the edge 91b lopsided in just one region on one side of a bisector C running along the direction A, in such a manner that the protruding end 91d is in line with one end of the edge 91b. Furthermore, the protruding end 91c and protruding end 91d are provided lopsided on the edges 91a and 91b in an identical direction on the direction that is perpendicular to the direction A.

For example, a width W3 of the protruding ends 91c and 91d, which is a direction perpendicular to the direction A is 6.5 µm, a width W1 of the slit 82b that is sandwiched between the edges 91a and 91b except for parts having the protruding ends 91c and 91d is 8 µm, and a width W2 of the slit 82b that is sandwiched between the protruding end 91c and the edge 91b, or is sandwiched between the edge 91a and the protruding end 91d, is 3 µm.

As such, the edge 91a of the pixel PIX1 and the edge 91b of the pixel PIX2 is not uniformly parallel to each other along a direction perpendicular to the direction A. Moreover, the protrusion provided extending into the slit 82b in the direction A on one of the edge 91a and edge 91b is increased just in a direction from the right side to the left side of the drawing, that is, from a region on a predetermined one side of a bisector C to a region on the other side of the bisector C, which bisector C runs along the direction A and is shared by the edges 91a and 91b and which region on one predetermined side of the bisector C and the another region on the other side of the bisector C are regions on the edges 91a and 91b, and each of the protrusions on the edges 91a and 91b are extended into the slit to reach its maximum in the another region on the other side of the bisector C. In this case, an alignment center P of liquid crystal molecules common to the pixel PIX1 and pixel PIX2 is positioned in the vicinity of a position on the slit 82b adjacent to a protruding angle formed by the protruding ends 91c and 91d in a part other than the end sections on the edges 91a and 91b.

As described above, in the configuration of FIG. 4, the alignment centers P that are provided commonly at a tip of each of the black-lines in a pair of pixel electrodes adjacent to each other is generated uniform with other pairs of pixel electrodes. Therefore, it is possible to generate alignment centers of liquid crystal molecules uniform with adjacent pairs of pixel electrodes, in the vicinity of a slit that is sandwiched between pixel electrodes that are adjacent to each other in a direction in which the data signal line extends and that are applied a voltage separately.

Moreover, in the configuration of FIG. 4, a large protrusion is provided on an edge of just one pixel electrode of the pair of pixel electrodes. This makes it possible to generate the alignment center P of the liquid crystal molecules at a particularly stable position. Furthermore, in this case, the pixel electrode to which the protrusion is provided is alternated between the pairs of pixel electrodes, as illustrated in FIG. 4. Hence, it is possible to level a difference in alignment state of liquid crystal molecules between two pixel electrodes within the pair of the pixel electrodes, between the other pairs of pixel electrodes. Thus, it is possible to attain an even display quality throughout the panel.

FIG. 5 illustrates a plan view of a pixel PIX including a pixel electrode of a third configuration.

The pixel PIX of FIG. 5 replaces the pixel electrode 81 of FIG. 3 with a pixel electrode 92.

The pixel electrode 92 of the pixel PIX1 has, on an edge (first edge) 92a that serves as a borderline with the slit 82b, an oblique edge 92c that is linearly and monotonously oblique along a direction perpendicular to the direction A, which oblique edge 92c gradually protrudes into the slit 82b in the direction A, and a protruding end 92e that is uniformly protruded to a maximum protruding point of the oblique edge 92c. The protruding end 92e is a straight line that is perpendicular to the direction A. The pixel electrode 92 of the pixel PIX2 has, on an edge (second edge) 92b that serves as a borderline with the slit 82b, an oblique edge 92d that is linearly and monotonously oblique along a direction perpendicular to the direction A, which oblique edge 92d gradually protrudes into the slit 82b in the direction A, and a protruding end 92f that is uniformly protruded to a maximum protruding point of the oblique edge 92d. The protruding end 92f is a straight line that is perpendicular to the direction A. Furthermore, the protruding end 92e and the protruding end 92f face each other.

Moreover, the protruding end 92e is provided on the edge 92a lopsided in just one region on one side of a bisector C running along the direction A, in such a manner that the protruding end 92e is in line with one end of the edge 92a. The protruding end 92f is provided on the edge 92b lopsided in just one region on one side of the bisector C running along the direction A, in such a manner that the protruding end 92f is in line with the one end of the edge 92b.

For example, a width W3 of the protruding ends 92e and 92f which width is in a direction perpendicular to the direction A is 5.5 µm, a maximum width W1 of the slit 82b at a part that is sandwiched between the oblique edge 92c and the oblique edge 92d is 8 µm, and a width W2 of the slit 82b at a part that is sandwiched between the protruding end 92e and the protruding end 92f is 3 µm.

As such, the edge 92a of the pixel PIX1 and the edge 92b of the pixel PIX2 are not uniformly parallel to each other along a direction perpendicular to the direction A. Moreover, the protrusion formed on both of the edge 92a and edge 92b into the slit 82b along the direction A is increased just along a direction from the right side to the left side of the drawing, that is, from a region on a predetermined one side of the bisector C to a region on the other side of the bisector C, which bisector C runs along the direction A and is shared by the edges 92a and 92b and which region on one predetermined side of the bisector C and the another region on the other side of the bisector C are regions on the edges 92a and 92b, and both the protrusions on the edges 92a and 92 are extended into the slit to reach its maximum in the another region on the other side of the bisector C. In this case, an alignment center P of liquid crystal molecules common to the pixel PIX1 and pixel PIX2 is positioned on the slit 82b at a position adjacent to a projecting angle formed by the protruding end 92e where the protruding end 92e and the oblique edge 92c connect on the edge 92a and a projecting angle formed by the protruding end 92f where the protruding end 92f and oblique edge 92d connect on the edge 92b.

As described above, in the configuration of FIG. 5, the alignment center P that is provided commonly on a tip of each of the black-lines of a pair of pixel electrodes adjacent to each other is generated uniformly with other pairs of pixel electrodes. Therefore, it is possible to generate alignment centers of liquid crystal molecules uniform with adjacent pairs of pixel electrodes, in the vicinity of a slit that is sandwiched between pixel electrodes that are adjacent to each other in a direction in which the data signal line extends and that are applied a voltage separately.

Moreover, in the configuration of FIG. 5, the protrusion is provided on an edge of each of the pixel electrodes of the pair of pixel electrodes adjacent to each other. Thus, it is possible to easily make an alignment state of liquid crystal molecules same between adjacent pixel electrodes, thereby attaining an even display quality throughout a panel.

Moreover, with the configuration of FIG. 5, an oblique edge is used as the protrusion. This makes a pixel electrode area larger than that in a case where a projecting protrusion is used, thereby allowing improvement in display brightness.

FIG. 6 illustrates a plan view of a pixel PIX that includes a pixel electrode of a fourth configuration, as a first comparative example.

The pixel PIX of FIG. 6 replaces the pixel electrode 81 of FIG. 3 with a pixel electrode 93.

Shapes of the pair of adjacent pixel electrodes are identical per alternate column; in one of alternate column groups, a pixel electrode 93 of the pixel PIX1 has two protruding ends 93c provided on an edge (first edge) 93a that serves as a borderline with the slit 82b, which protruding ends 93c protrude in a projecting manner into the slit 82b in the direction A. A pixel electrode 93 of the pixel PIX2 has an edge (second edge) 93b that serves as a borderline with the slit 82b, which edge 93b is a straight line that is perpendicular to the direction A. The other one of the alternate column groups has a pixel electrode 93 of the pixel PIX1 having an edge (first edge) 93a that serves as a borderline with the slit 82b, which edge 93a is a straight line that is perpendicular to the direction A, and a pixel electrode 93 of the pixel PIX2 having two protruding ends 93d on an edge (second edge) 93b that serves as a borderline with the slit 82b, which protruding ends 93d protrude in a projecting manner into the slit 82b in the direction A.

Moreover, the protruding ends 93c are provided respectively on each region on the edge 93a with respect to a bisector C running along the direction A, in such a manner that each of the protruding ends 93c are in line with respective ends of the edge 93a. The protruding ends 93d are provided respectively on each region on the edge 93b with respect to a bisector C running along the direction A, in such a manner that each of the protruding ends 93d are in line with respective ends of the edge 93b.

For example, a width W3 of the protruding ends 93c and 93d which is a direction perpendicular to the direction A is 5 µm, a width W1 of the slit 82b at a part that is sandwiched between the edges 93a and 93b except for parts having the protruding ends 93c and 93d is 6 µm, and a width W2 of the slit 82b at a part that is sandwiched between the protruding end 93c and the edge 93b, or a part sandwiched between the edge 93a and the protruding end 93d is 3 µm.

As described above, the edge 93a of the pixel PIX1 and the edge 93b of the pixel PIX2 are not uniformly parallel to each other along the direction perpendicular to the direction A. However, while one of the protrusions formed on one of the edge 93a and edge 93b, which protrusion protrudes into the slit 82b in the direction A, is increased in a direction from a right side to a left side of the drawing, the other one of the protrusions is increased along a direction from the left side to the right side of the drawing. Hence, the protrusions do not just increase in the direction from a predetermined one region on one side the bisector C to the other region on the other side of the bisector C, which bisector C runs along the direction A and is shared by the edges 93a and 93b. In this case, the alignment center P of the liquid crystal molecules that is common to the pixel PIX1 and pixel PIX2 becomes effected by the two protruding ends 93c and 93d on the edges 93a and 93b, thereby causing the possibility of the alignment center P be provided on either a right or left side, based on probability. This, as a result, causes instability.

FIG. 7 is a plan view illustrating a pixel PIX including a pixel electrode of a fifth configuration, as a second comparative example.

The pixel PIX of FIG. 7 replaces the pixel electrode 81 of FIG. 3 with a pixel electrode 94.

The pixel electrode 94 of the pixel PIX1 has, on an edge 94a that serves as a borderline with the slit 82b, (i) a base edge 94g that is a straight line which is perpendicular to the direction A, (ii) a protruding end 94e that uniformly protrudes in a projecting manner into the slit 82b in the direction A, which projects more into the slit 82b than the base edge 94g, and (iii) a protruding end 94c that further is uniformly protruded in a projecting manner towards the slit 82b in the direction A, which projects more into the slit 82b than the protruding end 94e. The pixel electrode 94 of the pixel PIX2 has, on an edge 94b that serves as a borderline with the slit 82b, a base edge 94h that is a straight line which is perpendicular to the direction A, (ii) a protruding end 94f that uniformly protrudes in a projecting manner into the slit 82b in the direction A, which protrudes more into the slit 82b than the base edge 94h, and (iii) a protruding end 94d that further is uniformly protruded in a projecting manner into the slit 82b in the direction A, which protrudes more into the slit 82b than the protruding end 94f.

The protruding end 94c and the base edge 94h face each other at most of their parts. The protruding end 94e and the protruding end 94f face each other at most of their parts. Further, the base edge 94g and the protruding end 94d face each other at most of their parts.

For example, a width W3 of the protruding ends 94c and 94d in a direction perpendicular to the direction A is 5 µm, a width W1 of the slit 82b at a part that is sandwiched between the protruding end 94e and the protruding end 94f is 6 µm, and a width W2 of the slit 82b at a part that is sandwiched between the protruding end 94c and the base edge 94h, and at a part sandwiched between the base edge 94a and the protruding end 94d is 3 μm.

As described, although the edge 94a of the pixel PIX1 and the edge 94b of the pixel PIX2 are not uniformly parallel to each other along a direction perpendicular to the direction A, the protrusion projecting into the slit 82b formed on the edge 94a in the direction A is increased along a direction from the right side to the left side of the drawing, whereas the protrusion projecting into the slit 82b provided on the edge 94b in the direction A is increased along a direction from the left side to the right side of the drawing. Therefore, the protrusion is not one which is increased just in the direction from one predetermined side on one side of a bisector C to the other side of the bisector C, which bisector C runs along the direction A and is shared by the edges 94a and 94b. In this case, the alignment center P of liquid crystal molecules common to the pixel PIX1 and pixel PIX2 is effected by the protrusion that increases in two opposite directions on the edges 94a and 94b, thereby causing the possibility of the alignment center P be provided on either the right or left side, based on probability. This, as a result, causes instability.

The following description deals with a few examples of alignment control structures that are usable in the present embodiment. The following alignment control structures are all provided on a counter electrode.

Figure 8:
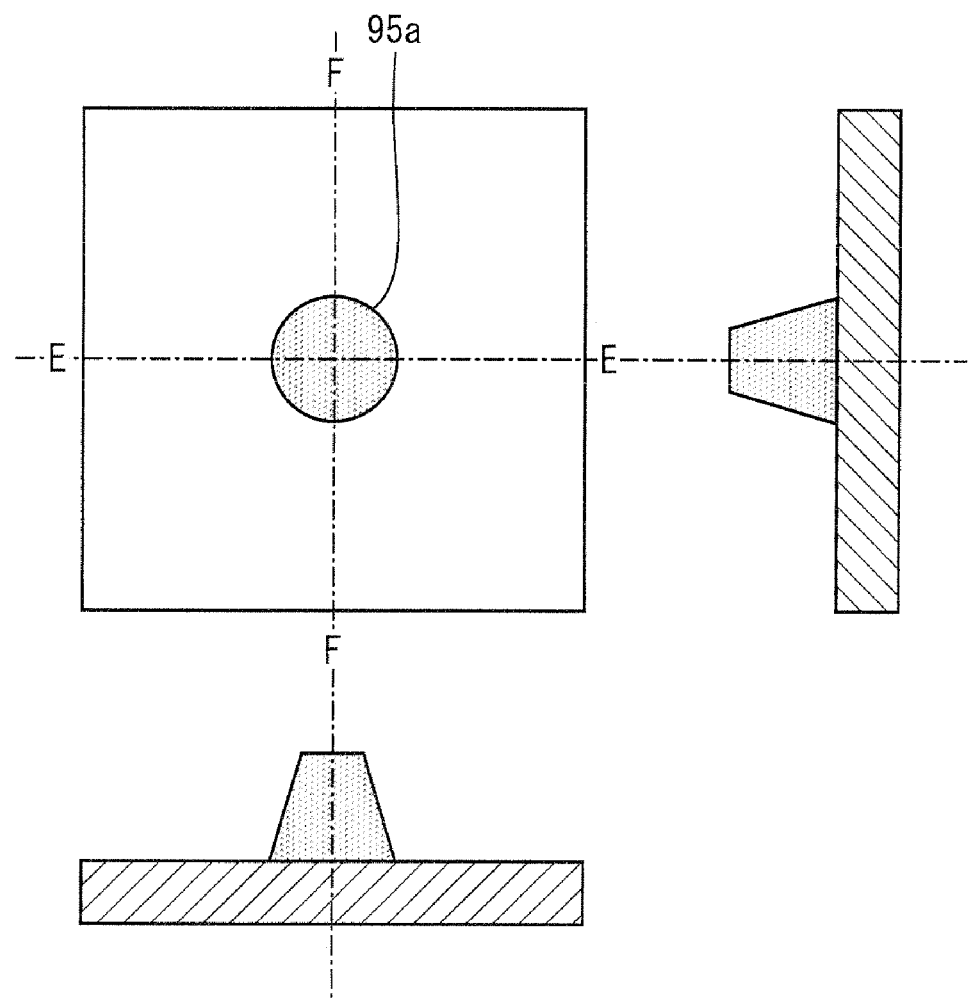
FIG. 8 illustrates an embodiment of the present invention, and is an orthographic view illustrating a plan view and cross-sectional views of a first form of an alignment control structure.

FIG. 8 illustrates an example in which a rivet 95a is used as an alignment control structure, which rivet 95a is seen as having a round shape when the counter electrode is illustrated as a plan view. The view below the plan view is a vertical cross-sectional view taken on line E-E that passes through a center of the rivet 95a, and the view on the right side of the plan view is a vertical cross-sectional view taken on line F-F that passes through the center and intersects at right angles with the line E-E.

Figure 9:
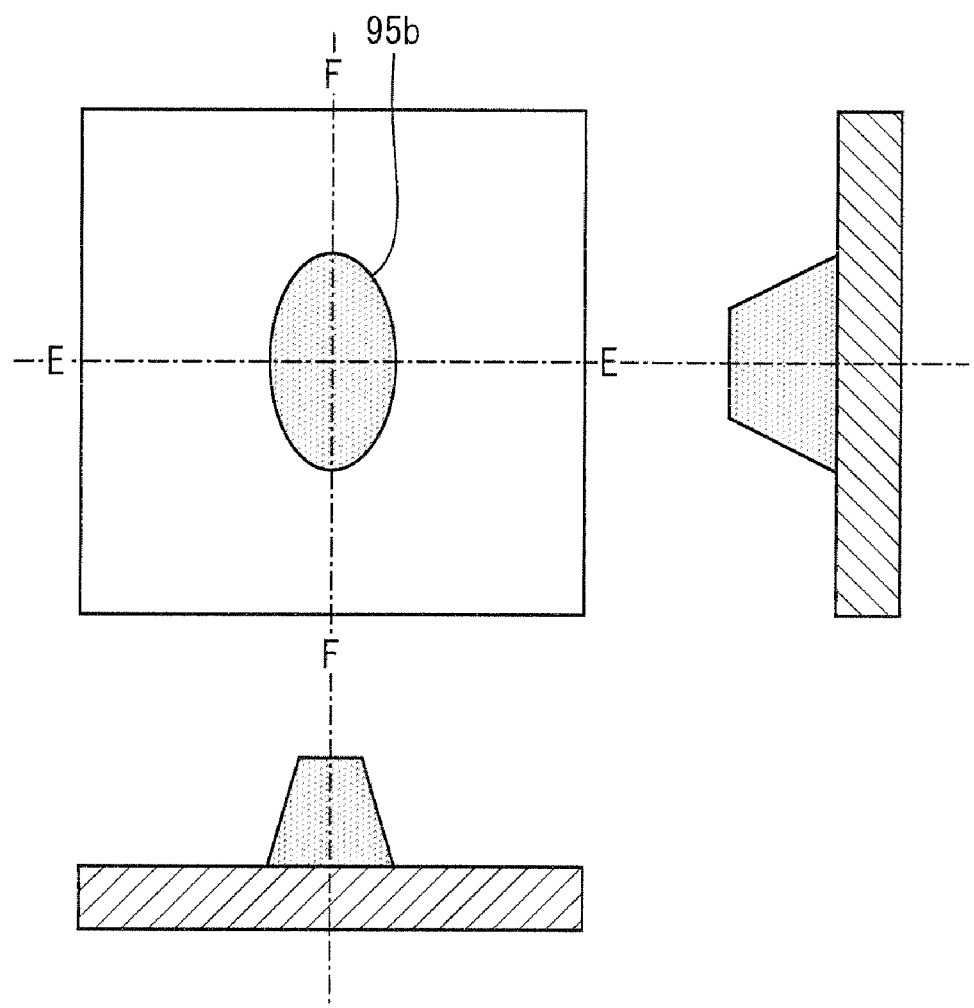
FIG. 9 illustrates an embodiment of the present invention, and is an orthographic view illustrating a plan view and cross-sectional views of a second form of an alignment control structure.

FIG. 9 illustrates an example in which a rivet 95b is used as an alignment control structure, which rivet 95b is seen as having an oval shape when the counter electrode is illustrated as a plan view. The view below the plan view is a vertical cross-sectional view taken on line E-E that passes through a center of the rivet 95b, and the view on the right side of the plan view is a vertical cross-sectional view taken on line F-F that passes through the center and intersects at right angles with the line E-E.

Figure 10:
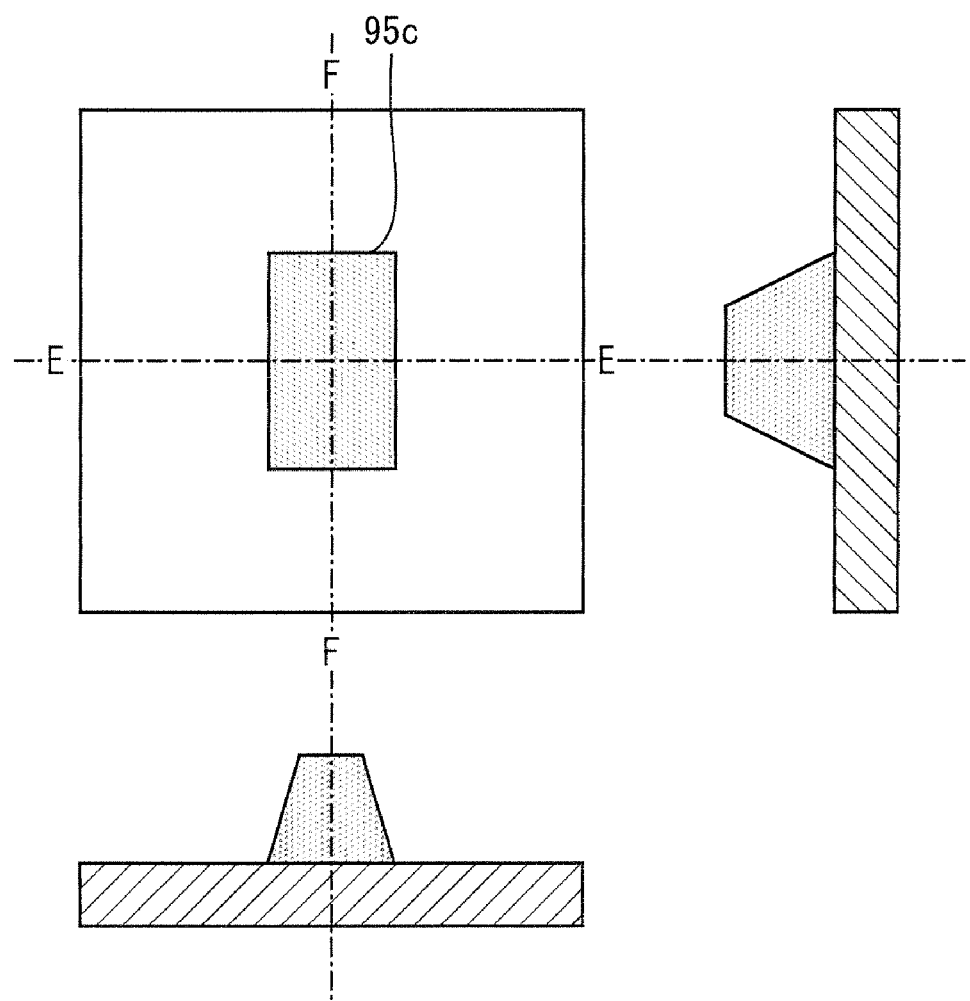
FIG. 10 illustrates an embodiment of the present invention, and is an orthographic view illustrating a plan view and cross-sectional views of a third form of an alignment control structure.

FIG. 10 is an example in which a rivet 95c is used as an alignment control structure, which rivet 95c is seen as having a rectangular shape (including a square) when the counter electrode is illustrated as a plan view. The view below the plan view is a vertical cross-sectional view taken on line E-E that passes through a center of the rivet 95c, and the view on the right side of the plan view is a vertical cross-sectional view taken on line F-F that passes through the center and intersects at right angles with the line E-E.

Figure 11:
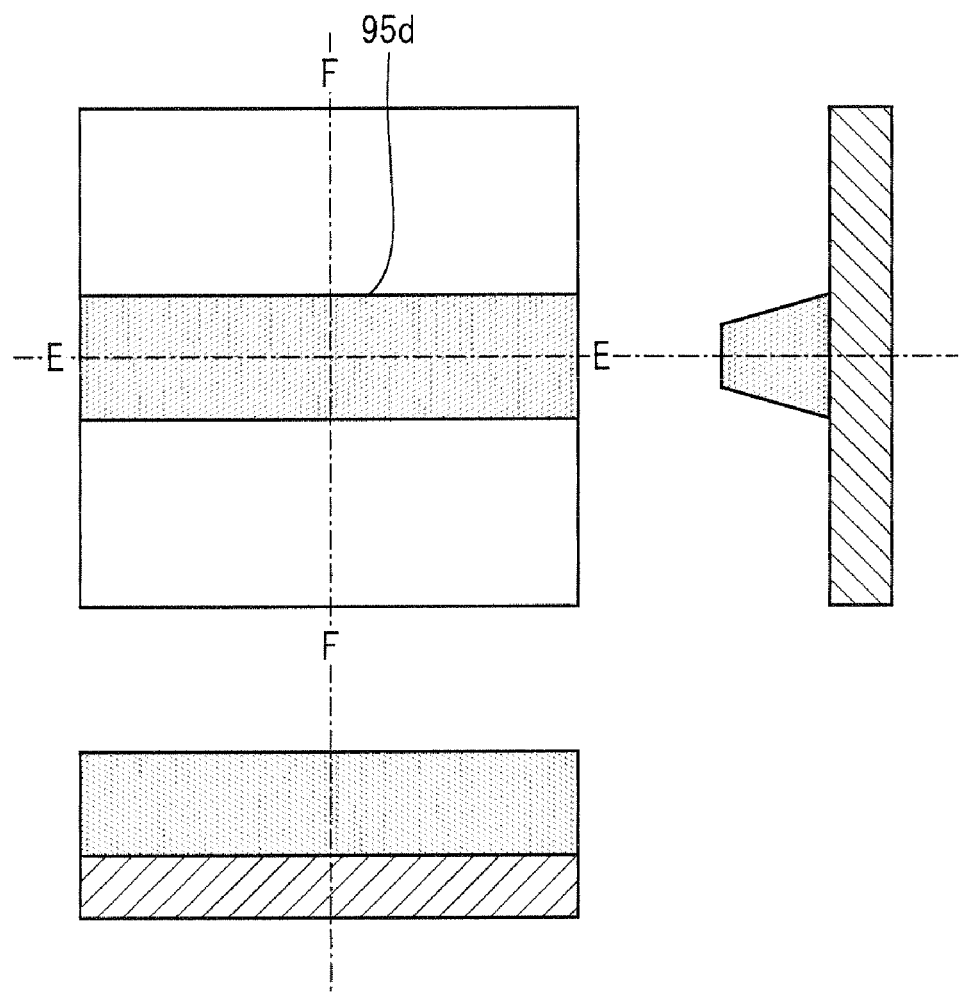
FIG. 11 illustrates an embodiment of the present invention, and is an orthographic view illustrating a plan view and cross-sectional views of a fourth form of an alignment control structure.

FIG. 11 is an example in which a rib 95d is used as an alignment control structure, which rib 95d is seen as having a linear shape when the counter electrode is illustrated as a plan view. The view below the plan view is a vertical cross-sectional view taken on line E-E that passes through a center of the rib 95b, and the view on the right side of the plan view is a vertical cross-sectional view taken on line F-F that passes through the center and intersects at right angles with the line E-E.

Figure 12:
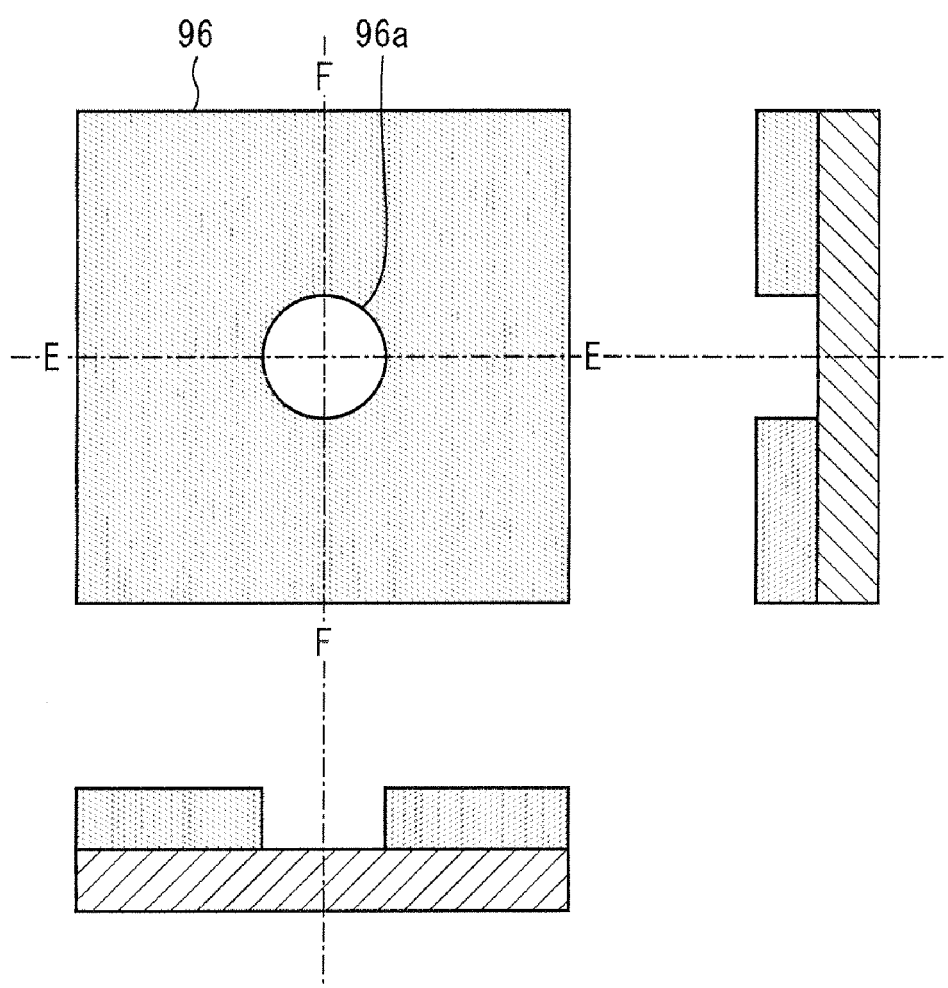
FIG. 12 illustrates an embodiment of the present invention, and is an orthographic view illustrating a plan view and cross-sectional views of a fifth form of an alignment control structure.

FIG. 12 is an example in which a hole 96a is used as an alignment control structure, which hole 96a is opened in a transparent electrode 96 and is seen to have a round shape when the counter electrode is illustrated as a plan view. The view below the plan view is a vertical cross-sectional view taken on line E-E that passes through a center of the hole 96a, and the view on the right side of the plan view is a vertical cross-sectional view taken on line F-F that passes through the center and intersects at right angles with the line E-E.

Figure 13:
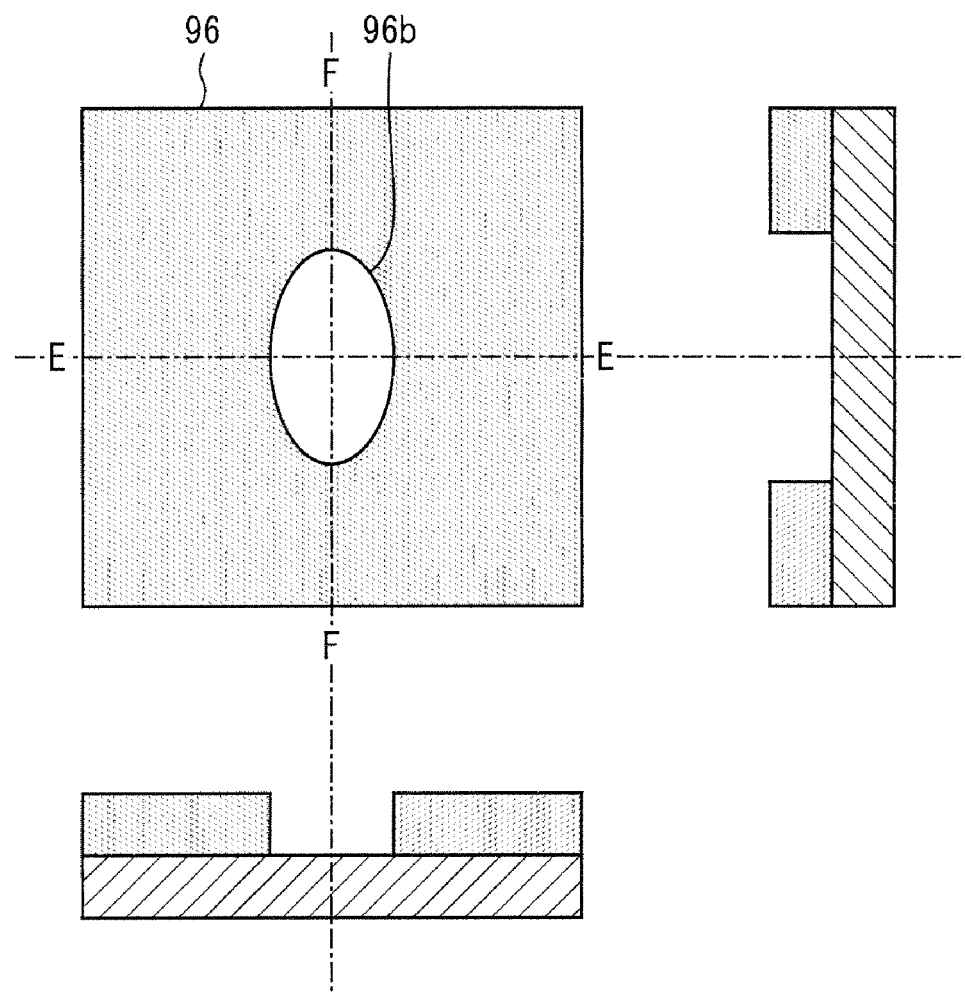
FIG. 13 illustrates an embodiment of the present invention, and is an orthographic view illustrating a plan view and cross-sectional views of a sixth form of an alignment control structure.

FIG. 13 is an example in which a hole 96b is used as an alignment control structure, which hole 96b is opened in a transparent electrode 96 and is seen to have an oval shape when the counter electrode is illustrated as a plan view. The view below the plan view is a vertical cross-sectional view taken on line E-E that passes through a center of hole 96b, and the view on the right side of the plan view is a vertical cross-sectional view taken on line F-F that passes through the center and intersects at right angles with the line E-E.

Figure 14:
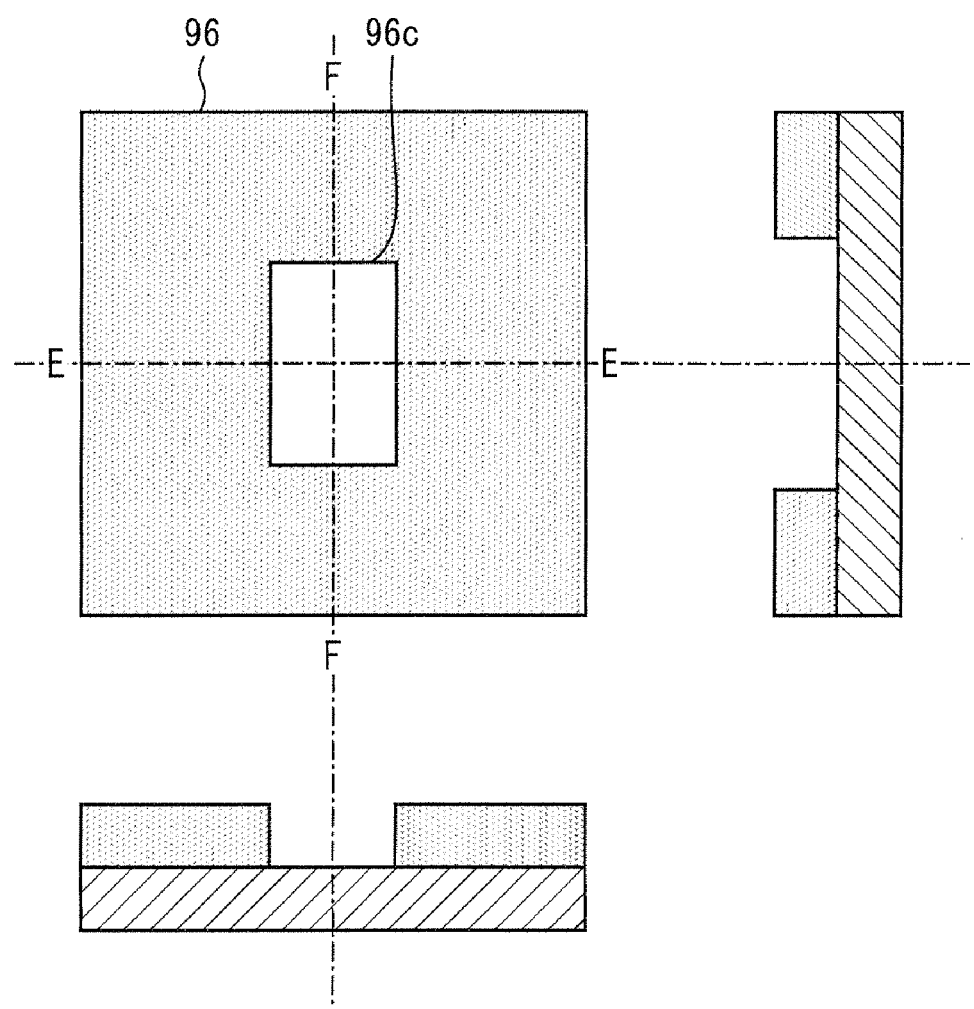
FIG. 14 illustrates an embodiment of the present invention, and is an orthographic view illustrating a plan view and cross-sectional views of a seventh form of an alignment control structure.

FIG. 14 is an example in which a hole 96c is used as an alignment control structure, which hole 96c is opened to a transparent electrode 96 and is seen to have a rectangular shape (square) when the counter electrode is illustrated as a plan view. The view below the plan view is a vertical cross-sectional view taken on line E-E that passes through a center of the hole 96c, and the view on the right side of the plan view is a vertical cross-sectional view taken on line F-F that passes through the center and intersects at right angles with the line E-E.

Figure 15:
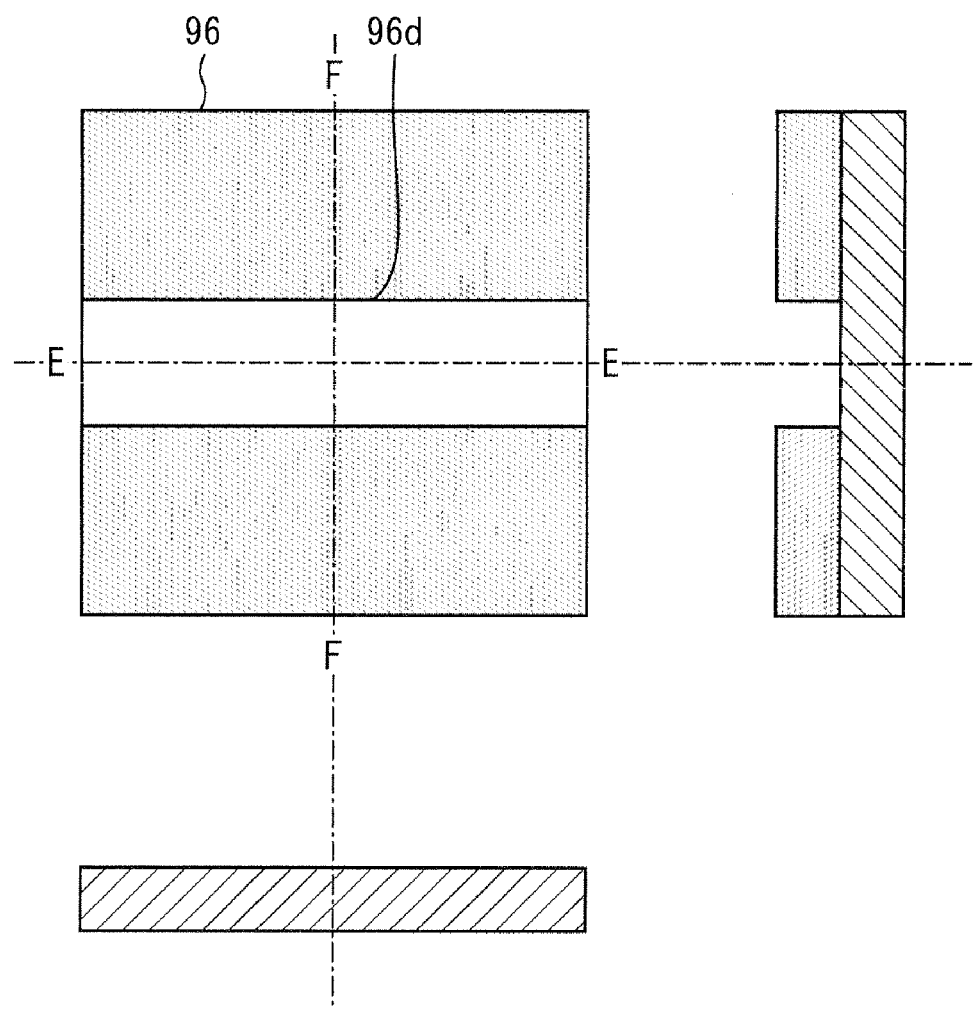
FIG. 15 illustrates an embodiment of the present invention, and is an orthographic view illustrating a plan view and cross-sectional views of an eighth form of an alignment control structure.

FIG. 15 is an example in which a slit 96d is used as an alignment control structure, which slit 96d is opened in the transparent electrode 96 and is seen to have a linear shape when illustrated as a plan view. The view below the plan view is a vertical cross-sectional view taken on line E-E that passes through a center of the slit 96d, and the view on the right side of the plan view is a vertical cross-sectional view taken on line F-F that passes through the center and intersects at right angles with the line E-E.

Figure 16:
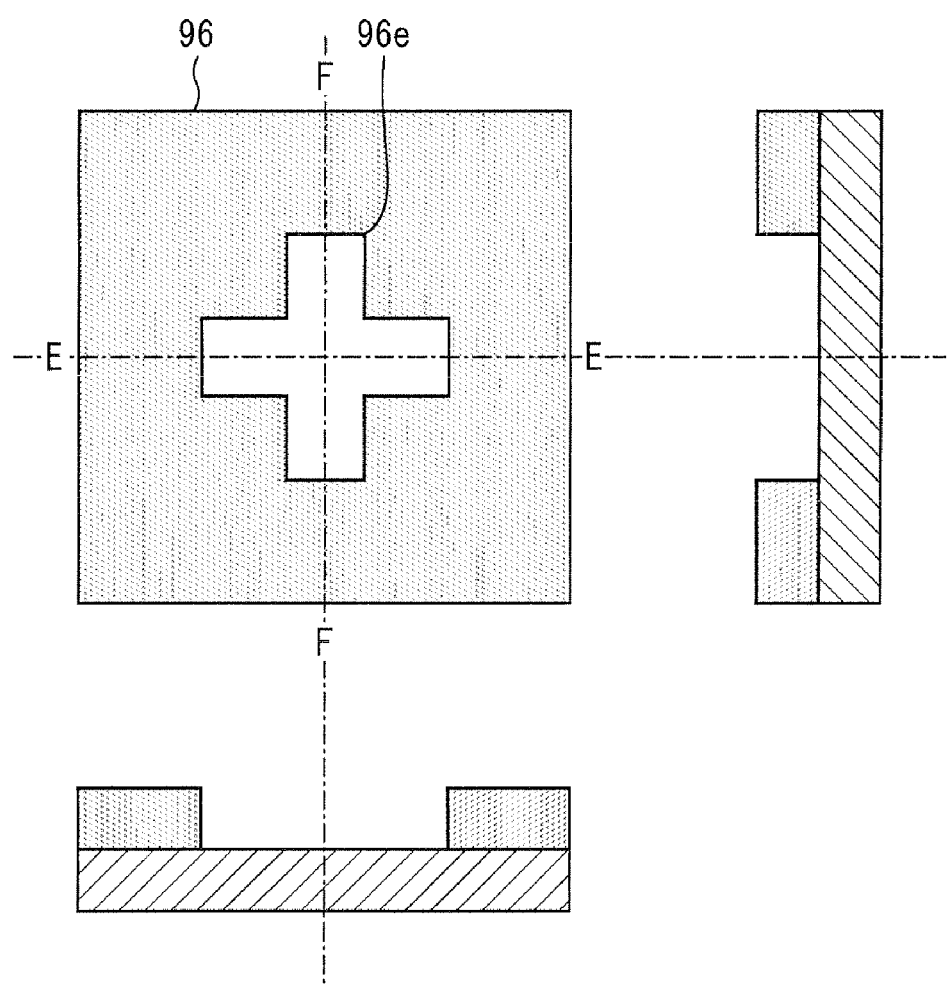
FIG. 16 illustrates an embodiment of the present invention, and is an orthographic view illustrating a plan view and cross-sectional views of a ninth form of an alignment control structure.

FIG. 16 is an example in which a hole 96e is used as an alignment control structure, which hole 96e is opened in the transparent electrode 96 and is seen to have a crosswise shape when the counter electrode is illustrated as a plan view. The view below the plan view is a vertical cross-sectional view taken on line E-E that passes through a center of the hole 96e, and the view on the right side of the plan view is a vertical cross-sectional view taken on line F-F that passes through the center and intersects at right angles with the line E-E.

The above describes the present embodiment. The present invention may also be applied to pixel electrodes having two reflecting regions that are aligned adjacent to each other and sandwiching a slit therebetween.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

The present invention is suitably used in a liquid crystal display of a vertical alignment mode.

The invention claimed is:
1. A liquid crystal display comprising:
a liquid crystal layer driven by a vertical alignment mode; and
pixel electrodes,
each two pixel electrodes being disposed adjacent to each other in a first direction so as to sandwich a slit therebetween, the two pixel electrodes separately accepting writing-in of data signals, the first direction being a direction in which data signal lines extend, and the liquid crystal layer, corresponding to at least one of the two pixel electrodes, having an alignment control structure disposed on its counter electrode, one pixel electrode of the two pixel electrodes having a first edge being an edge serving as a borderline between the one pixel electrode and the slit, and the other pixel electrode of the two pixel electrodes having a second edge being an edge serving as a borderline between the other pixel electrode and the slit, the first edge and the second edge being not uniformly parallel to each other along a direction that is perpendicular to the first direction, the first edge and the second edge sharing a bisector that extends along the first direction and runs through centers of the first edge and the second edge, one or both of the first edge and the second edge having a protrusion provided extending into the slit in the first direction, the protrusion(s) being increased just along a direction from a region on one predetermined side of the bisector to another region on the other side of the bisector, the region on one predetermined side of the bisector and the another region on the other side of the bisector being regions on the first and second edges on which the protrusion(s) are provided, and all of the protrusion(s) being extended into the slit to reach its maximum in the another region on the other side of the bisector.

2. The liquid crystal display according to claim 1, wherein:
the protrusion is provided on both the first edge and the second edge.

3. The liquid crystal display according to claim 2, wherein:
the first edge and the second edge have an oblique edge that is linearly and monotonously oblique with respect to a direction that is perpendicular to the first direction, the oblique edge gradually protruding into the slit in the first direction.

4. The liquid crystal display according to claim 3, wherein:
the protrusion is formed just by the oblique edge.

5. The liquid crystal display according to claim 3, wherein:
the protrusion is formed by (i) the oblique edge and (ii) a protruding end that is uniformly protruding by an amount of a maximum protruding point of the oblique edge, the protruding end being connected to the maximum protruding point of the oblique edge.

6. The liquid crystal display according to claim 5, wherein:
the protruding end of the protrusion on the first edge and the protruding end of the protrusion on the second edge face each other.

7. The liquid crystal display according to claim 1, wherein:
the pixel electrodes are paired so as to form pairs of the two pixel electrodes disposed adjacent to each other, and in each of the pairs of the two pixel electrodes, the protrusion is provided on an edge of just one pixel electrode of the paired two pixel electrodes.

8. The liquid crystal display according to claim 7, wherein:
the pairs of the pixel electrodes are disposed adjacent to each other in such a manner that the protrusion is provided alternately on the first edge and the second edge in the pairs of the pixel electrodes.

9. The liquid crystal display according to claim 1, wherein:
the protrusion is formed by having a protruding end that protrudes uniformly into the slit in the first direction.

10. The liquid crystal display according to claim 9, wherein:
the protrusion is provided on both the first edge and the second edge, and
the protruding end of the protrusion on the first edge and the protruding end of the protrusion on the second edge face each other.

11. The liquid crystal display according to claim 9, wherein:
the pixel electrodes are paired so as to form pairs of the two pixel electrodes disposed adjacent to each other, and in each of the pairs of the two pixel electrodes, the protrusion is provided on an edge of just one pixel electrode of the paired two pixel electrodes.

12. The liquid crystal display according to claim 11, wherein:
the pairs of the pixel electrodes are disposed adjacent to each other in such a manner that the protrusion is provided alternately on the first edge and the second edge in the pairs of the pixel electrodes.

13. The liquid crystal display according to claim 1, wherein:
the alignment control structure is a rivet.

14. The liquid crystal display according to claim 1, wherein:
the alignment control structure is a hole opened in the counter electrode.

15. The liquid crystal display according to claim 1, wherein:
the alignment control structure is a slit provided in the counter electrode.

16. The liquid crystal display according to claim 1, wherein:
the alignment control structure is a rib.

* * * * *